(12) United States Patent
Vachhani et al.

(10) Patent No.: US 12,277,768 B2
(45) Date of Patent: Apr. 15, 2025

(54) METHOD AND ELECTRONIC DEVICE FOR GENERATING A SEGMENT OF A VIDEO

(71) Applicant: Samsung Electronics Co., Ltd., Suwon-si (KR)

(72) Inventors: Jayesh Rajkumar Vachhani, Bengaluru (IN); Sourabh Vasant Gothe, Bengaluru (IN); Barath Raj Kandur Raja, Bengaluru (IN); Pranay Kashyap, Bengaluru (IN); Rakshith Srinivas, Bengaluru (IN); Rishabh Khurana, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/357,627

(22) Filed: Jul. 24, 2023

(65) Prior Publication Data

US 2023/0368534 A1    Nov. 16, 2023

Related U.S. Application Data

(63) Continuation of application No. PCT/IB2023/054910, filed on May 12, 2023.

(30) Foreign Application Priority Data

May 12, 2022  (IN) ............................. 202241027488
Jan. 18, 2023  (IN) ............................. 2022 41027488

(51) Int. Cl.
*H04N 21/85*    (2011.01)
*G06V 20/40*    (2022.01)
*G06V 40/20*    (2022.01)

(52) U.S. Cl.
CPC .............. *G06V 20/49* (2022.01); *G06V 40/20* (2022.01)

(58) Field of Classification Search
USPC ......................................... 386/241, 248, 278
See application file for complete search history.

(56) References Cited

U.S. PATENT DOCUMENTS

| | | | |
|---|---|---|---|
| 8,238,718 B2 | 8/2012 | Toyama et al. | |
| 9,472,188 B1 * | 10/2016 | Ouimette | ................ G10L 15/26 |
| 9,846,815 B2 | 12/2017 | Karsh et al. | |
| 10,229,326 B2 | 3/2019 | Grundmann et al. | |
| 10,452,712 B2 | 10/2019 | Mei et al. | |

(Continued)

FOREIGN PATENT DOCUMENTS

| | | |
|---|---|---|
| CN | 113259761 A | 8/2021 |
| CN | 114283351 A | 4/2022 |

(Continued)

OTHER PUBLICATIONS

Lin et al., BSN: Boundary Sensitive Network for Temporal Action Proposal Generation, arXiv:1806.02964v3, Sep. 26, 2018.

(Continued)

*Primary Examiner* — Nigar Chowdhury
(74) *Attorney, Agent, or Firm* — Jefferson IP Law, LLP

(57) ABSTRACT

A method for generating at least one segment of a video by an electronic device is provided. The method includes identifying at least one of a context associated with the video and an interaction of a user in connection with the video, analyzing at least one parameter in at least one frame of the video with reference to at least one of the context and the interaction of the user, wherein the at least one parameter includes at least one of a subject, an environment, an action of the subject, and an object, determining the at least one frame in which a change in the at least one parameter occurs, and generating at least one segment of the video comprising the at least one frame in which the parameter changed as a temporal boundary of the at least one segment.

19 Claims, 34 Drawing Sheets

(56) References Cited

U.S. PATENT DOCUMENTS

| | | | |
|---|---|---|---|
| 10,949,674 | B2 | 3/2021 | Hwangbo et al. |
| 2003/0185450 | A1* | 10/2003 | Garakani ............... G06V 20/40 |
| | | | 382/232 |
| 2016/0014482 | A1 | 1/2016 | Chen et al. |
| 2016/0334970 | A1* | 11/2016 | Mysore Veera ...... G06F 3/0481 |
| 2017/0109584 | A1 | 4/2017 | Yao et al. |
| 2017/0311368 | A1* | 10/2017 | Kandur Raja .......... H04L 41/22 |
| 2018/0213288 | A1 | 7/2018 | Patry et al. |
| 2019/0114487 | A1 | 4/2019 | Vijayanarasimhan et al. |
| 2019/0206445 | A1 | 7/2019 | Matias et al. |
| 2020/0074185 | A1 | 3/2020 | Rhodes et al. |
| 2020/0334290 | A1* | 10/2020 | Dontcheva ............ G06F 16/738 |
| 2020/0364464 | A1* | 11/2020 | Vijayanarasimhan ....................... |
| | | | G06V 20/30 |
| 2021/0021912 | A1* | 1/2021 | Rozhenkov ........ H04N 21/8541 |
| 2021/0201047 | A1* | 7/2021 | Hwangbo ............. G06V 10/764 |
| 2022/0075513 | A1 | 3/2022 | Walker et al. |
| 2022/0076025 | A1* | 3/2022 | Shin ....................... G06V 20/49 |

FOREIGN PATENT DOCUMENTS

| | | |
|---|---|---|
| EP | 3 491 546 A1 | 6/2019 |
| WO | 2018/022853 A1 | 2/2018 |

OTHER PUBLICATIONS

Lin et al., BMN: Boundary-Matching Network for Temporal Action Proposal Generation, arXiv:1907.09702v1, Jul. 23, 2019.
Kang et al., Winning the CVPR'2021 Kinetics—GEBD Challenge: Contrastive Learning Approach, arXiv:2106.11549v1, Jun. 22, 2021.
Shou, Mike Zheng et al., Generic event boundary detection: A benchmark for event segmentation, Proceedings of the IEEE/CVF International Conference on Computer Vision, 2021.
Wang, Limin et al., Temporal segment networks: Towards good practices for deep action recognition, European conference on computer vision. Springer, Cham, arXiv:1608.00859v1, Aug. 2, 2016.
International Search Report dated Aug. 29, 2023, issued in International Application No. PCT/IB2023/054910.
Wang Yuxuan et al., GEB+: A benchmark for generic event boundary captioning, grounding and text-based retrieval, Apr. 10, 2022, XP093241121.
Indian Office Action dated Dec. 23, 2024, issued in Indian Application No. 202241027488.
European Search Report dated Jan. 29, 2025, issued in European Application No. 23803138.9.

* cited by examiner

Smart select on video

Sharing Video

Smart Share for Videos

METHOD AND ELECTRONIC DEVICE FOR GENERATING A SEGMENT OF A VIDEO

CROSS-REFERENCE TO RELATED APPLICATION(S)

This application is a continuation application, claiming priority under § 365 (c), of an International application No. PCT/IB2023/054910, filed on May 12, 2023, which is based on and claims the benefit of an Indian Provisional patent application No. 20/2241027488, filed on May 12, 2022, in the Indian Patent Office, and of an Indian Complete patent application No. 202241027488, filed on Jan. 18, 2023, in the Indian Patent Office, the disclosure of each of which is incorporated by reference herein in its entirety.

TECHNICAL FIELD

The disclosure relates to content processing methods and systems. More particularly, the disclosure relates to systems and methods for identifying/creating/generating/handling intelligent temporal video segments based on class agnostic video cut networks.

BACKGROUND ART

In the current era of multimodal data being consumed by users, efficient on-device video understanding and processing has become the need in a current situation. Various existing methods and systems are used for generating a short segment of video (or video clip) from a digital multimedia content (e.g., digital video). The systems can be, for example, but not limited to a Boundary-Sensitive Network (BSN), Boundary-Matching network (BMN), Generic Event Boundary Detection (GEBD) or the like.

In the existing systems, the BSN comprises three stages such as temporal evaluation module, a proposal generation module, and a proposal evaluation module. The temporal evaluation module uses convolution layers and a sigmoid output layer with multiple filters to predict start, end and action probabilities separately for all temporal locations. The proposal generation module is used for generating candidate proposals and corresponding proposal-level features (e.g., BSN features). The proposal evaluation module uses fully connected layers to evaluate the confidence score for each proposal whether it contains an action instance within its duration using the BSN features. However, the BSN features constructed in the BSN are not enough to capture a temporal context. The BSN is suitable for limited taxonomy of videos and no feature to construct most representative clip of the video.

In another existing systems, the BMN includes a base module, a temporal evaluation module and a proposal evaluation module. The base module handles input features, expand a receptive field and serve as a backbone of the BMN. The temporal evaluation module uses one-dimensional (1D) convolutions to predict the start and end probabilities separately for all temporal locations. The proposal evaluation module uses three-dimensional (3D) and two-dimensional (2D) convolution layers to generate the Boundary-Matching (BM) confidence map which contains the confidence scores for the densely populated proposals. However, in the BMN, no feature to construct most representative clip of the video is disclosed.

The issues in the related art include generic events like shot changes, subject change etc., not being used for predicting important clips; multiple separate pipelines for test, audio and visual cues making it more complex and time consuming, not suitable for on-device. Further, no the related art does not address ranking multiple important clips.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide systems (or electronic device) and methods for identifying/creating/generating/handling intelligent temporal segments based on class agnostic video cut networks.

Another aspect of the disclosure is to utilize a Temporal self-similarity Matrix (TSSM) to establish the relationship between video frames and predict class-agnostic boundaries.

Another aspect of the disclosure is to identify an auxiliary context based on a user interaction and a state of the video.

Another aspect of the disclosure is to generate taxonomy free intelligent temporal segments based on predicted boundaries by refining taxonomy free boundaries, generating and filtering taxonomy free proposals for generated temporal segments, and generating boundary category (based on environment, subject, object of interaction, action, shot) based temporal segments.

Another aspect of the disclosure is to construct most representative clip using single or multiple predicted event proposals.

Another aspect of the disclosure is to rank the final predicted smart cuts.

Another aspect of disclosure is to predict category of the corresponding event boundaries.

Another aspect of the disclosure is to compute an affinity score between the intelligent temporal segments and the input video, based on boundary features and boundary categories, compute an auxiliary score for boundaries based on auxiliary context and boundary categories and ranking the temporal segments based on the affinity score and the auxiliary score.

Another aspect of the disclosure is to predict the intelligent temporal segment by identifying boundary category of auxiliary context and predicting the temporal segment based on boundary categories and auxiliary context.

Additional aspects will be set forth in part in the description which follows and, in part, will be apparent from the description, or may be learned by practice of the presented embodiments.

DISCLOSURE

Technical Solution

In accordance with an aspect of the disclosure, methods for generating at least one segment of a video are provided. The method includes identifying, by an electronic device, at least one of a context associated with the video and an interaction of a user in connection with the video, analyzing, by the electronic device, at least one parameter in at least one frame of the video with reference to at least one of the context and the interaction of the user, wherein the at least one parameter includes at least one of a subject, an environment, an action of the subject, and an object, determining, by the electronic device, the at least one frame in which there a change in the at least one parameter occurs, and generating, by the electronic device, at least one segment of the video comprising the at least one frame in which the at least one parameter changed as a temporal boundary of the at least one segment.

In an embodiment, the context includes at least one of a discussion regarding the video in a social media application, capturing a screenshot of the frame of the video, sharing the video, editing the video, and generating a story based on the video.

In an embodiment, the segment includes at least one of a short video story, a combination of clips and a video clip.

In an embodiment, a length of the at least one segment is less than a length of the video.

In an embodiment, the interaction of the user in connection with the video includes interaction of the user with at least one of the subject, the environment, an action of the subject, and the object.

In an embodiment, predicting the temporal boundary comprises establishing, by the electronic device, a relationship between frames of the video by utilizing a Temporal self-similarity Matrix (TSSM). Alternatively, the relationship between frames of the video is determined by other knows techniques. The techniques are determined based on the implementation.

In an embodiment, the method includes performing at least one action, by the electronic device, using the temporal boundary of the at least one segment, wherein the at least one action comprises at least one of a video screenshot, a smart share suggestion for the video, a boundary aware story in a gallery and a tap and download video cuts in a video editor.

In an embodiment, the at least one segment of the video is generated with or without the context.

In accordance with another aspect of the disclosure, methods for generating at least one segment of a video are provided. The method includes receiving, by an electronic device, at least one first user action on at least one first frame of the video. Further, the method includes triggering, by the electronic device, a generation of the segment of the video based on the at least one first user action on the at least one first frame of the video. Further, the method includes receiving, by the electronic device, at least one second user action on at least one second frame of the video, where the second user action indicates completing the segment generation. Further, the method includes generating, by the electronic device, a video segment from the video based on the at least one first user action and the at least one second user action. Further, the method includes appending, by the electronic device, a predefined number of frames before the first frame to generate the video segment.

In accordance with another aspect of the disclosure, methods for generating at least one segment of a video are provided. The method includes acquiring, by an electronic device, at least one feature from at least one frame associated with the video. Further, the method includes identifying, by the electronic device, at least one context based on a user interaction on the video. Further, the method includes predicting, by the electronic device, at least one of a class-agnostic boundary, a boundary feature, and a boundary category from the acquired features. Further, the method includes generating, by the electronic device, the at least one segment of the video in response to the at least one acquired feature, the identification and the prediction.

In an embodiment, the method includes ranking, by the electronic device, the at least one generated segment based on at least one of the boundary feature, the boundary category, and the context.

In an embodiment, the at least one segment is generated by refining taxonomy free boundaries of the video, predicting the boundary category, generating and filtering taxonomy free proposals based on the refined taxonomy free boundaries and the boundary category, and generating temporal segment from the at least one generated proposals.

In an embodiment, the at least one generated segment are ranked by computing an affinity score between the at least one generated segment and an input video based on at least one of the boundary feature and the boundary category, computing an auxiliary score for boundaries based on the context and the boundary category, and ranking the at least one generated segment based on the affinity score and the auxiliary score.

In an embodiment, the at least one features are intermediate outputs from a trained deep neural network model.

In an embodiment, the class-agnostic boundary is a boundary of a generic event occurred in the video.

In an embodiment, the boundary feature is an intermediate outputs from a trained deep neural network model for the frames within the predicted event boundaries.

In an embodiment, the boundary category is determined based on a change in subject, environment, object of interaction, shot and action.

In accordance with another aspect of the disclosure, an electronic device is provided. The electronic device includes a processor, a memory, and a video segment generator coupled with the processor and the memory. The video segment generator is configured to identify at least one of a context associated with the video and an interaction of a user in connection with the video, configured to analyze at least one parameter in at least one frame of the video with reference to at least one of the context and the interaction of the user, wherein the at least one parameter includes at least one of a subject, an environment, an action of the subject, and an object in connection with the context or taxonomy free, determine the at least one frame in which a change in the at least one parameter occurs, generate at least one segment of the video comprising the at least one frame in which the at least one parameter has changed as a temporal boundary of the at least one segment, and rank the at least one generated segment of the video based on at least one of a boundary feature, a boundary category, and a context.

In accordance with another aspect of the disclosure, an electronic device is provided. The electronic device includes a video segment generator coupled with a processor and a memory. The video segment generator is configured to receive at least one first user action on at least one first frame of the video. Further, the video segment generator is configured to trigger a generation of the segment of the video based on the at least one first user action on the at least one first frame of the video. Further, the video segment generator is configured to receive at least one second user action on at least one second frame of the video. The second user action indicates completing the segment generation. Further, the video segment generator is configured to generate at least one video segment from the video based on the at least one first user action and the at least one second user action. Further, the video segment generator is configured to append a predefined number of frames before the first frame to generate the video segment.

In accordance with another aspect of the disclosure, an electronic device is provided. The electronic device includes a video segment generator coupled with a processor and a memory. The video segment generator is configured to acquire at least one feature from at least one frame associated with the video. The video segment generator is configured to identify at least one context based on a user interaction on the video. The video segment generator is configured to predict at least one of a class-agnostic boundary, a boundary feature, and a boundary category. The video segment generator is configured to generate at least one segment of the video in response to the at least one acquired feature, the identification, and the prediction.

In an embodiment, the systems (or electronic device) and methods can be used for utilize the TSSM to establish the relationship between video frames. In an embodiment, the systems and methods can be used to construct most representative clip using single or multiple predicted event proposals.

In an embodiment, the systems (or electronic device) and methods can be used to rank the final predicted smart cuts. In an embodiment, the systems and methods can be used to predict category of the corresponding event boundaries. In an embodiment, the systems and methods can be used to predict intelligent temporal segment based on image.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
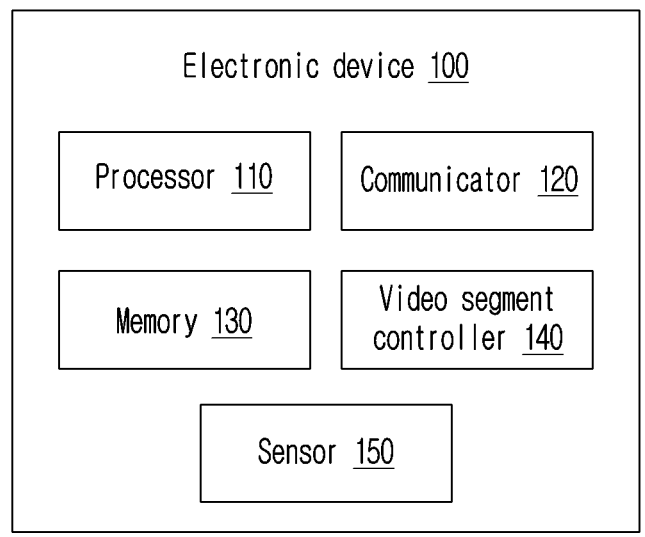
FIG. 1 shows various hardware components of an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary of skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve methods for generating at least one segment of a video. The method includes identifying, by an electronic device, at least one of a context associated with the video and an interaction of a user in connection with the video. Further, the method includes analyzing, by the electronic device, at least one parameter in at least one frame of the video with reference to at least one of the context and the interaction of the user. The at least one parameter includes at least one of a subject, an environment, an action of the subject, and an object. Further, the method includes determining, by the electronic device, the at least one frame at which there is an occurrence of a change in the at least one parameter. Further, the method includes generating, by the electronic device, at least one segment of the video comprising the at least one frame at which there is a change in the parameter as a temporal boundary of the at least one segment.

Unlike methods and systems of the related, the method described herein may be used for identifying/creating/generating/handling intelligent temporal video segments based on class agnostic video cut networks. The electronic device and methods may be used for utilizing the TSSM to establish the relationship between video frames. The systems (or electronic device) and methods may be used to construct most representative clip using single or multiple predicted event proposals. The systems and methods may be used to rank the final predicted smart cuts. In an embodiment, the systems and methods can be used to predict category of the corresponding event boundaries. The systems and methods may be used to predict intelligent temporal segment based on image. In an embodiment, a proposed architecture works on class-agnostic videos. The class agnostic means the temporal segments are not dependent on type of event that is happening; for example, the event may be cooking, playing, celebration etc. The method can be used to analyze parameters from frames of videos to identify changes which signify semantic boundaries irrespective of type of event.

Referring now to the drawings, and more particularly to FIGS. 1 to 4, 5A, 5B, 6 to 12, 13A, 13B, 14, 15A, 15B, 16A, 16B, 17A, 17B, 18A, 18B, and 19 to 28, where similar reference characters denote corresponding features consistently throughout the figures, there are shown at least one embodiment.

FIG. 1 shows various hardware components of an electronic device 100, according to an embodiment of the disclosure.

Referring to FIG. 1, the electronic device 100 can be, for example, but not limited to a laptop, a desktop computer, a notebook, a Device-to-Device (D2D) device, a vehicle to everything (V2X) device, a smartphone, a foldable phone, a smart television (TV), a tablet, an immersive device, and an internet of things (IoT) device. The electronic device 100 includes a processor 110, a communicator 120, a memory 130, a video segment generator 140, and a sensor 150. The processor 110 is coupled with the communicator 120, the memory 130, the video segment generator 140, and the sensor 150.

The video segment generator 140 may be configured to identify at least one of a context associated with a video (e.g., digital video or the like) and an interaction of a user in connection with the video. The context includes at least one of a discussion regarding the video in a social media application (e.g., Facebook®, Youtube® or the like), capturing a screenshot of the frame of the video, sharing the video, editing the video, and generating a story based on the video. The context identification is based on the action performed by the user with respect to the video like discussing regarding the video, capturing screenshot of a video frame, sharing the video, editing the video, generating story based on video etc.

The interaction of the user in connection with the video includes interaction of the user with at least one of the subject, the environment, an action of the subject, and the object. Interaction of the user signifying the user's interest in one or more parameter(s) of the video, like user pausing the video at a particular frame, watching a part of video multiple times which gives an idea that user might be interested in a particular subject or environment or interaction between subject-object or action of the subject in a particular environment or object etc.

The video segment generator 140 may be configured to analyze at least one parameter in at least one frame of the video with reference to at least one of the context and the interaction of the user. The parameter includes at least one of the subject, the environment, the action of the subject, and the object in connection with the context or taxonomy free.

The video segment generator 140 may be configured to determine the at least one frame at which there is an occurrence of a change in the at least one parameter. The video segment generator 140 may be configured to generate at least one segment of the video comprising the at least one frame at which there is a change in the parameter as a temporal boundary of the at least one segment. The segment can be, but is not limited to, a short video story, a combination of clips, and a video clip. The length of the at least one segment is less than a length of the video. The temporal boundary is predicted by establishing a relationship between frames of the video by utilizing a Temporal self-similarity Matrix (TSSM). Alternatively, the relationship between frames of the video is determined by other knows techniques. The techniques are determined based on the implementation.

The video segment generator 140 may be configured to perform an action using the temporal boundary of the at least one segment. The action can be, for example, but not limited to a video screenshot, a smart share suggestion for the video, a boundary aware story in a gallery and a tap and download video cuts in a video editor The video segment generator 140 may also be configured to receive at least one first user action on at least one first frame of the video. The video segment generator 140 may be configured to trigger a generation of the segment of the video based on the at least one first user action on the at least one first frame of the video. The video segment generator 140 may be configured to receive at least one second user action on at least one second frame of the video. The second user action indicates completing the segment generation. The video segment generator 140 may be configured to generate at least one video segment from the video based on the at least one first user action and the at least one second user action. The video segment generator 140 may be configured to append a predefined number of frames before the first frame to generate the video segment.

The video segment generator 140 may also be configured to acquire at least one feature from at least one frame associated with the video. The features are intermediate outputs from a trained deep neural network model. The video segment generator 140 may be configured to identify the at least one context based on the user interaction on the video. The video segment generator 140 may be configured to predict at least one of a class-agnostic boundary, a boundary feature, and a boundary category. The class-agnostic boundary is a boundary of a generic event occurred in the video. The boundary feature is an intermediate output from a trained deep neural network model for the frames within the predicted event boundaries. The boundary category is determined based on a change in subject, environment, object of interaction, shot and action.

The video segment generator 140 may be configured to generate at least one segment of the video in response to the at least one acquired feature, the identification, and the prediction. The segment is generated by refining taxonomy free boundaries of the video, predicting the boundary category, generating and filtering taxonomy free proposals based on the refined taxonomy free boundaries and the boundary category, and generating temporal segment from the at least one generated proposal. In an example, based on the class-agnostic boundaries, multiple temporal segments are created of varied duration, start, end timestamps; these segments are ranked based on affinity score which takes 'Interaction of user' into consideration; further based on the identified context, final temporal segments are selected and given to user as 'Video Screenshot', 'Ready Cuts in Video Editor', 'Boundary aware Gallery stories', 'Smart share options', and the like.

The video segment generator 140 may be configured to rank the at least one generated segment based on at least one of the boundary feature, the boundary category, and the context. The at least one generated segment may be ranked by computing an affinity score between the at least one generated segment and an input video based on at least one of the boundary feature and the boundary category, computing an auxiliary score for boundaries based on the context and the boundary category, and ranking the at least one generated segment based on the affinity score and the auxiliary score.

The video segment generator 140 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard disks, optical disks, floppy disks, flash memories, or forms of electrically programmable read only memories (EPROMs) or electrically erasable and programmable ROM (EEPROM) memories. In addition, the memory 130 may be a non-transitory storage medium. The term "non-transitory" indicates that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

At least one of the pluralities of modules/controller may be implemented through the artificial intelligence (AI) model using a data driven controller (not shown). The data driven controller (not shown) can be a machine learning (ML) model based controller and AI model based controller. A function associated with the AI model may be performed through the non-volatile memory, the volatile memory, and the processor 110. The processor 110 may include one or a plurality of processors. One or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 1 shows various hardware components of the electronic device 100, it is to be understood that other embodiments are not limited thereon. In other embodiments, the electronic device 100 may include a different number of components. Further, the labels or names of the components are used only for illustrative purpose and does not limit the scope of the disclosure. One or more components can be combined together to perform same or substantially similar function in the electronic device (100).

Figure 2:
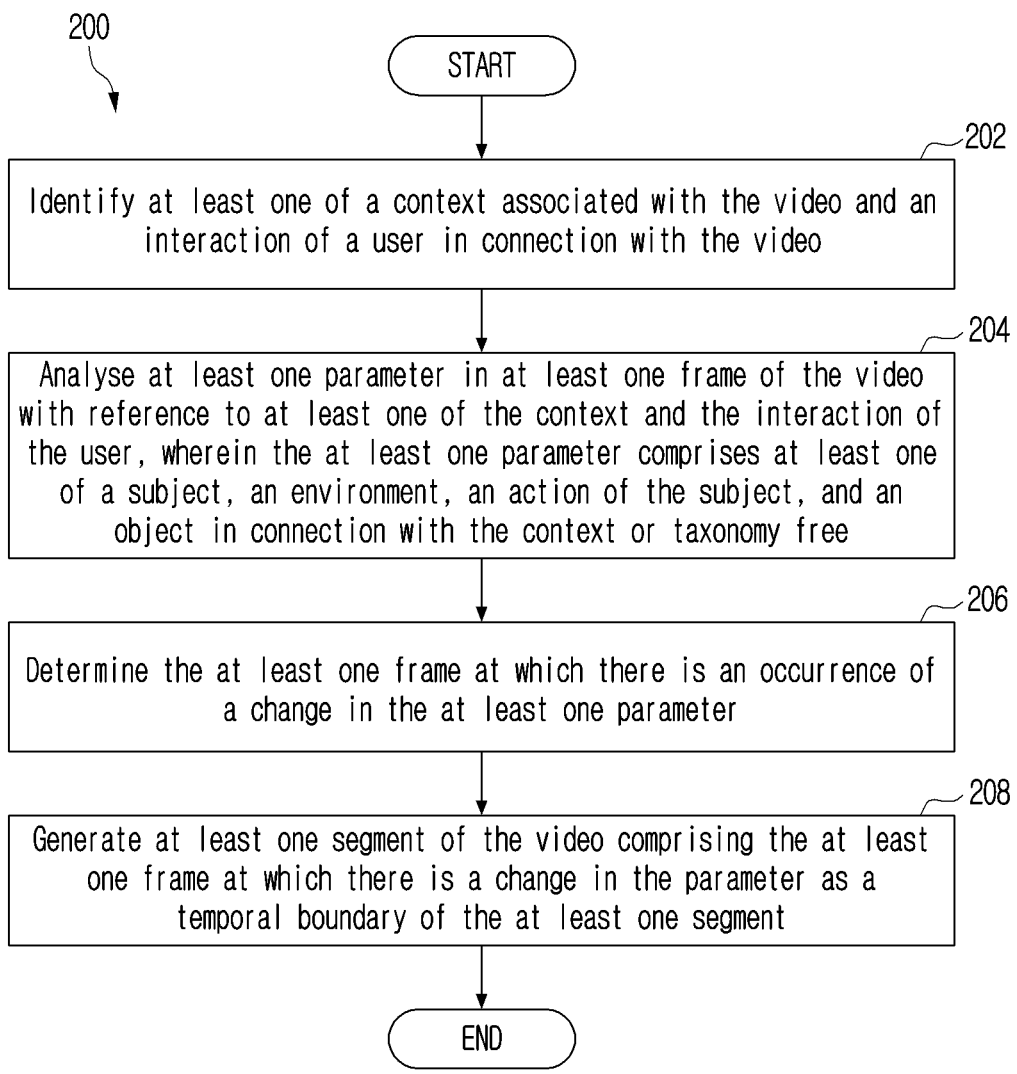
FIGS. 2, 3, and 4 are flowcharts illustrating a method for generating at least one segment of a video, according to various embodiments of the disclosure.
Figure 3:
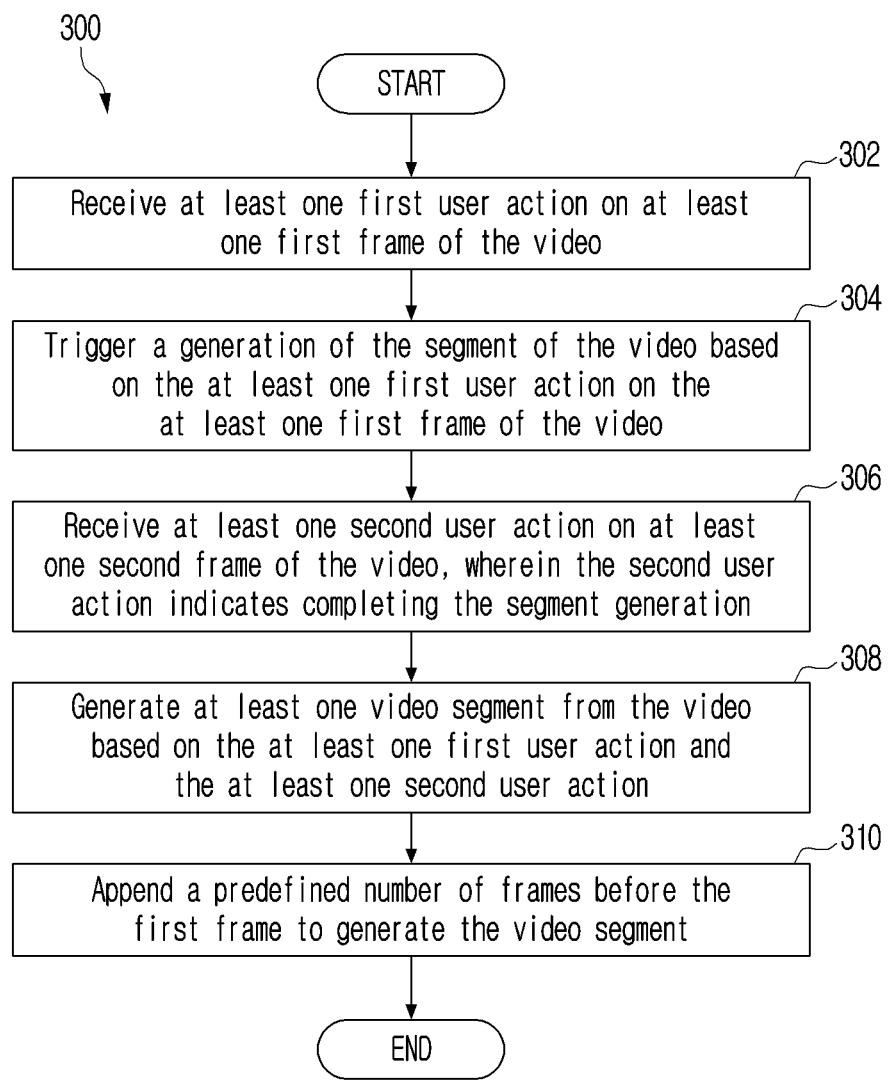
Figure 4:
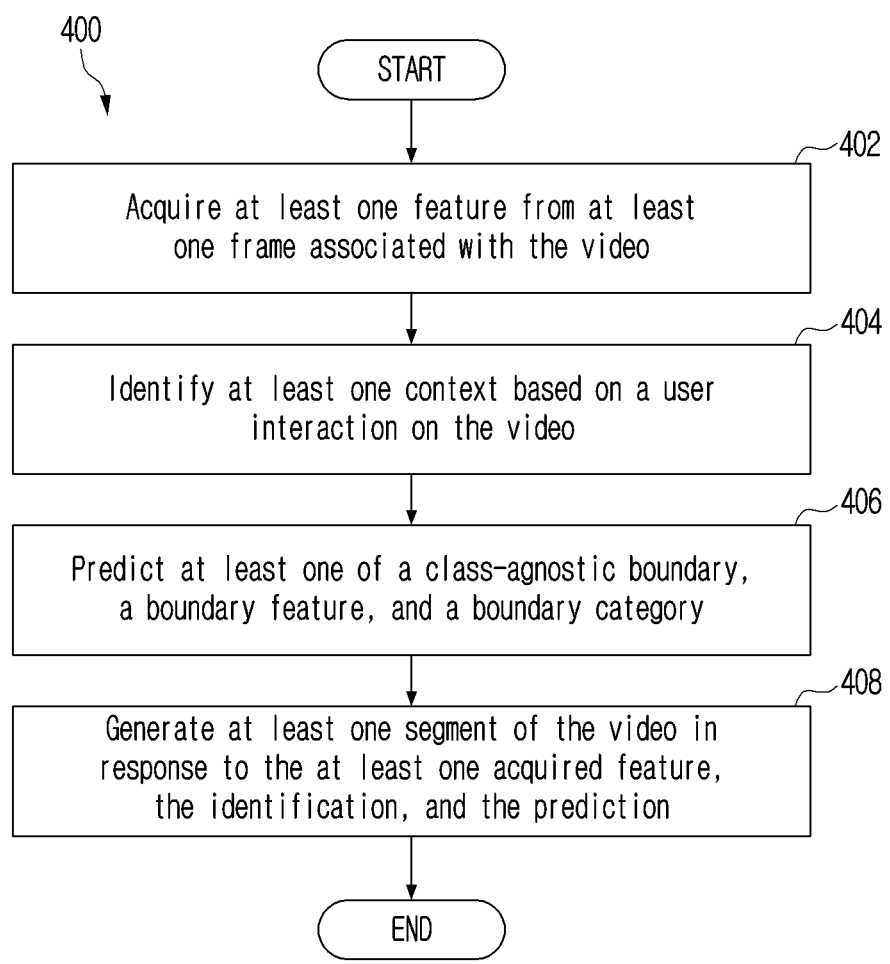

FIGS. 2, 3, and 4 are flowcharts (200 to 400) illustrating a method for generating at least one segment of the video, according to various embodiments of the disclosure.

Referring to FIG. 2, the operations 202-208 are performed by the video segment generator (140). At operation 202, the method includes identifying the at least one of the context associated with the video and the interaction of the user in connection with the video. At operation 204, the method includes analyzing the at least one parameter in at least one frame of the video with reference to at least one of the context and the interaction of the user. The at least one parameter includes at least one of the subject, the environment, the action of the subject, and the object. At operation 206, the method includes determining the at least one frame at which there is an occurrence of a change in the at least one parameter. At operation 208, the method includes generating at least one segment of the video comprising the at least one frame at which there is a change in the parameter as a temporal boundary of the at least one segment.

Referring to FIG. 3, the operations 302-310 are performed by the video segment generator 140. At operation 302, the method includes receiving the at least one first user action on the at least one first frame of the video. At operation 304, the method includes triggering the generation of the segment of the video based on the at least one first user action on the at least one first frame of the video. At operation 306, the method includes receiving at least one second user action on the at least one second frame of the video. The second user action indicates completing the segment generation. At operation 308, the method includes generating a video segment from the video based on the at least one first user action and the at least one second user action. At operation 310, the method includes appending the predefined number of frames before the first frame to generate the video segment.

Referring to FIG. 4, the operations 402-408 are performed by the video segment generator 140. At operation 402, the video segment generator acquires the at least one feature from at least one frame associated with the video. At operation 404, the video segment generator 140 identifies at least one context based on a user interaction on the video. At operation 406, the video segment generator 140 predicts at least one of a class-agnostic boundary, a boundary feature, and a boundary category from the acquired features. At operation 408, the video segment generator 140 generates the at least one segment of the video in response to the at least one acquired feature, the identification, and the prediction.

Figure 5A:
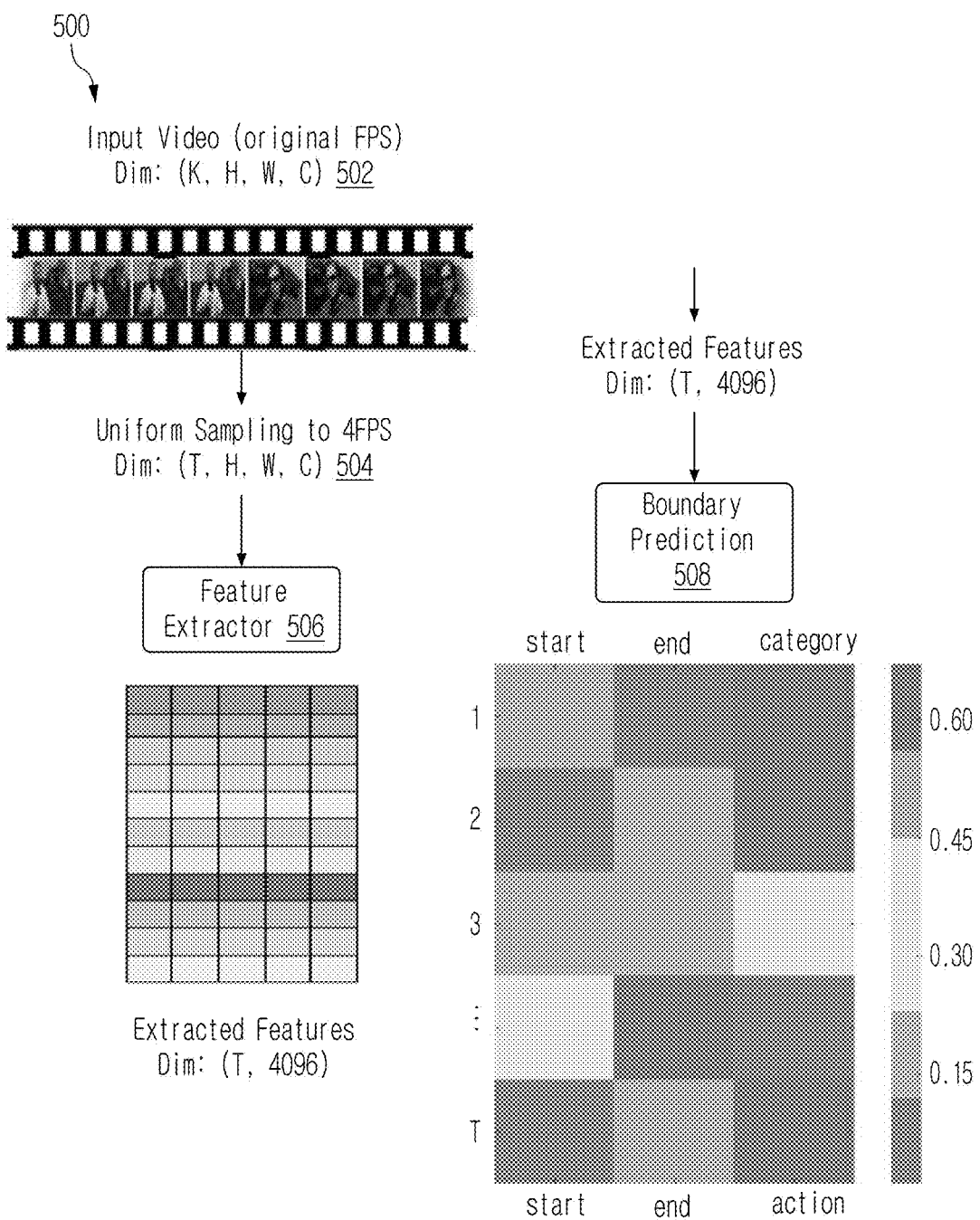
FIGS. 5A and 5B are flowchart illustrating an overall flow of methods for handling intelligent temporal segments based on class agnostic video cut networks, according to various embodiments of the disclosure.
Figure 5B:
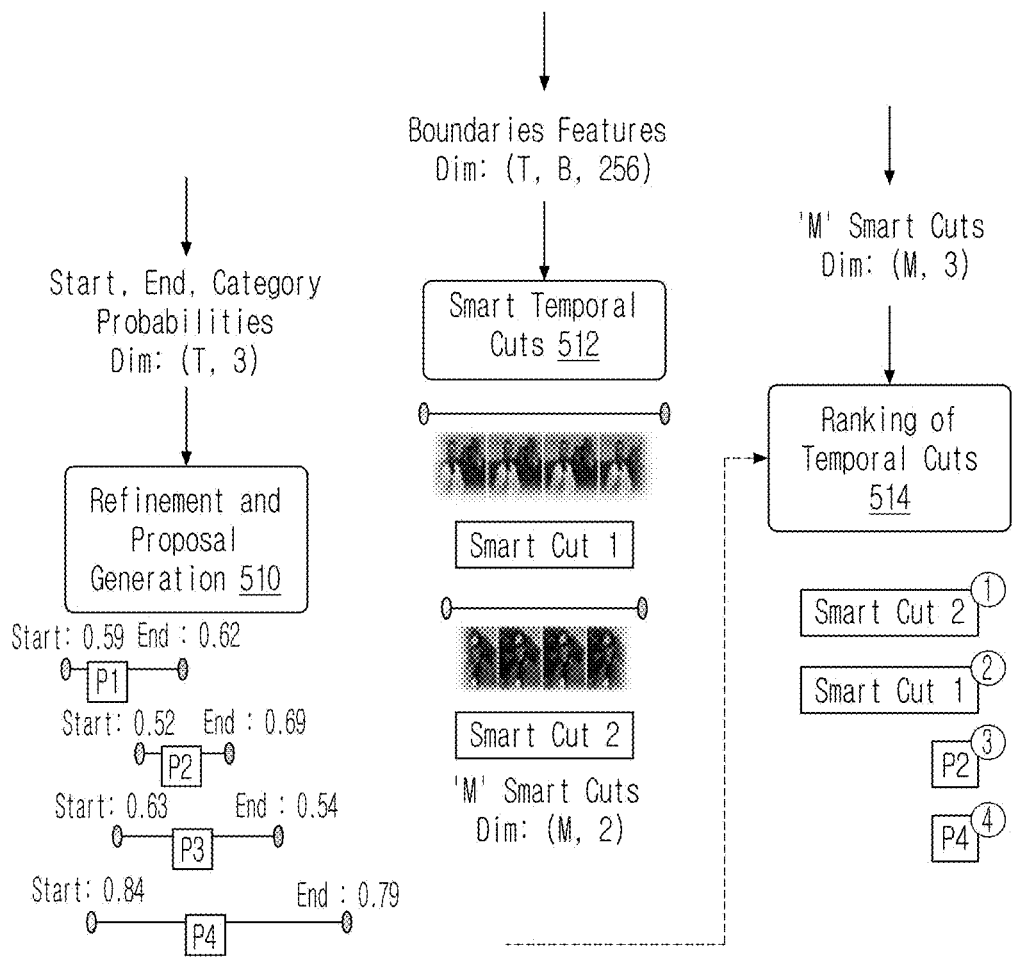

FIGS. 5A and 5B are flowcharts 500 illustrating an overall flow of methods for identifying/creating/generating/handling intelligent temporal segments based on class agnostic video cut networks, according to various embodiments of the disclosure.

Referring to FIGS. 5A and 5B, at operation 502, the electronic device 100 receives the input video (original frames per second (FPS)). The input video has a dimension (K, H, W, C), where K corresponds to total number of frames, H corresponds to height of each frame, W corresponds to width of each frame and C corresponds to number of channels in each frame (usually representing R, G and B). At operation 504, the electronic device 100 performs the uniform sampling of the video at 4 FPS (i.e., the video is sampled at 4 FPS). After the uniform sampling, the video has the dimension (T, H, W, C), where T corresponds to total number of sampled frames, H corresponds to height of each frame, W corresponds to width of each frame and C corresponds to number of channels in each frame (usually representing R, G and B). At operation 506, the electronic device 100 extracts the feature from the sampled frames. In an example, the extracted features have dimension (T, 4096), where T corresponds to total number of sampled frames. At operation 508, the electronic device 100 predicts the boundary from the extracted features. The boundary prediction is explained in FIG. 6. After predicting the boundary, the electronic device (100) determines the start, end, and category probabilities. Upon determining the start, end, and category probabilities, the electronic device 100 performs the refinement and proposal generation at operation 510. The Refinement and Proposal Generation is explained in FIG. 7. The refinement and proposal generation includes a plurality of segments including the start time and end times.

After performing the refinement and proposal generation, at operation 512, the electronic device 100 provides the plurality of the smart temporal cuts. The smart temporal cut block based on the subject is explained in FIG. 8. The smart temporal cut block based on an action is explained in FIG. 9. The smart temporal cut block based on a cluster is explained in FIGS. 10 and 11. At operation 514, the electronic device (100) ranks the plurality of the smart temporal cuts. The ranking of temporal cuts is explained in FIGS. 12, 13A, and 13B.

Figure 6:
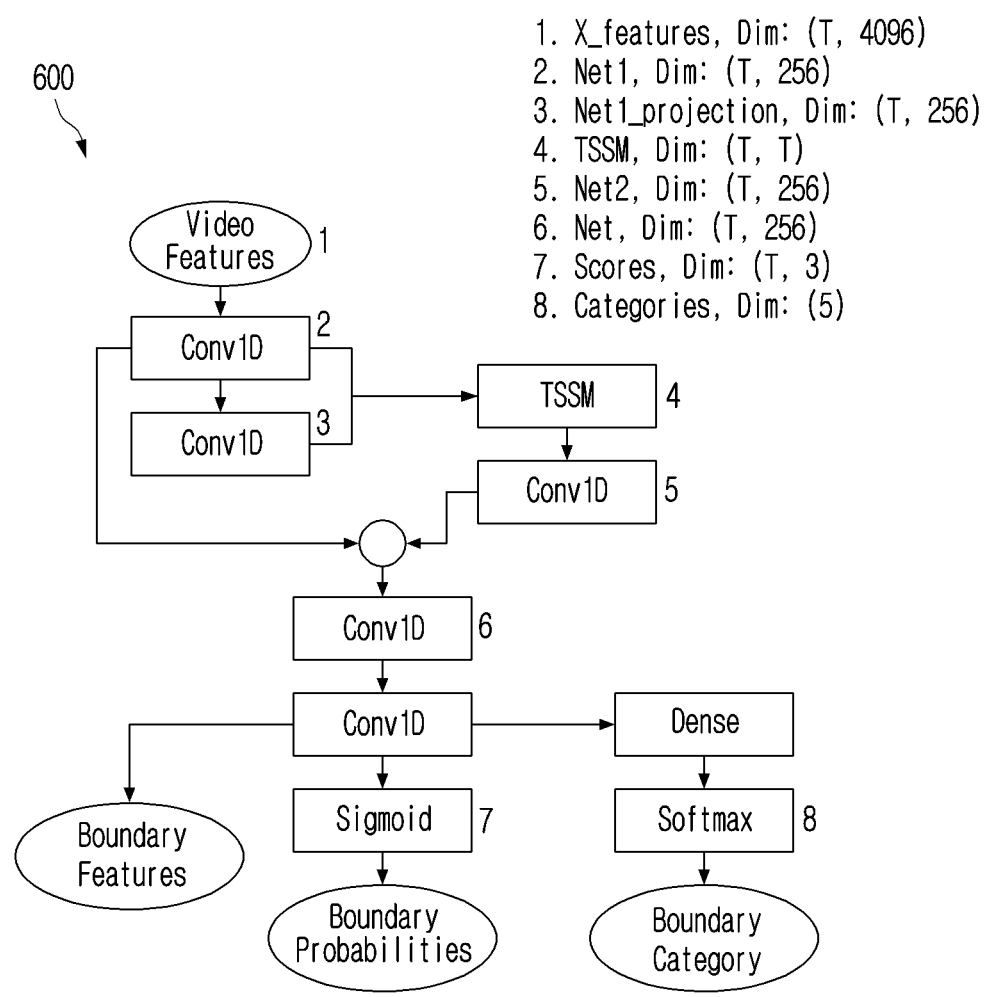
FIG. 6 illustrates a boundary prediction block in connection with FIGS. 5A and 5B, according to an embodiment of the disclosure.

FIG. 6 illustrates a boundary prediction block 600 in connection with FIGS. 5A and 5B, according to an embodiment of the disclosure.

Referring to the FIG. 6, two-stream video feature sequences are passed through a series of Conv1D layers at operations 1-3. At operation 4, the Temporal self-Similarity Matrix (TSSM) is generated by calculating the cosine distance between the down sampled features—Net1 and its projection—Net1_projection. At operations 5 to 8, the final Conv1D layer has 3 kernels and a sigmoid activation to output start and end probabilities for all temporal locations. The system has a Dense layer followed by a Softmax layer to predict one of the 5 boundary categories. The final Conv1D layer output is used as Boundary Features for next Block.

Figure 7:
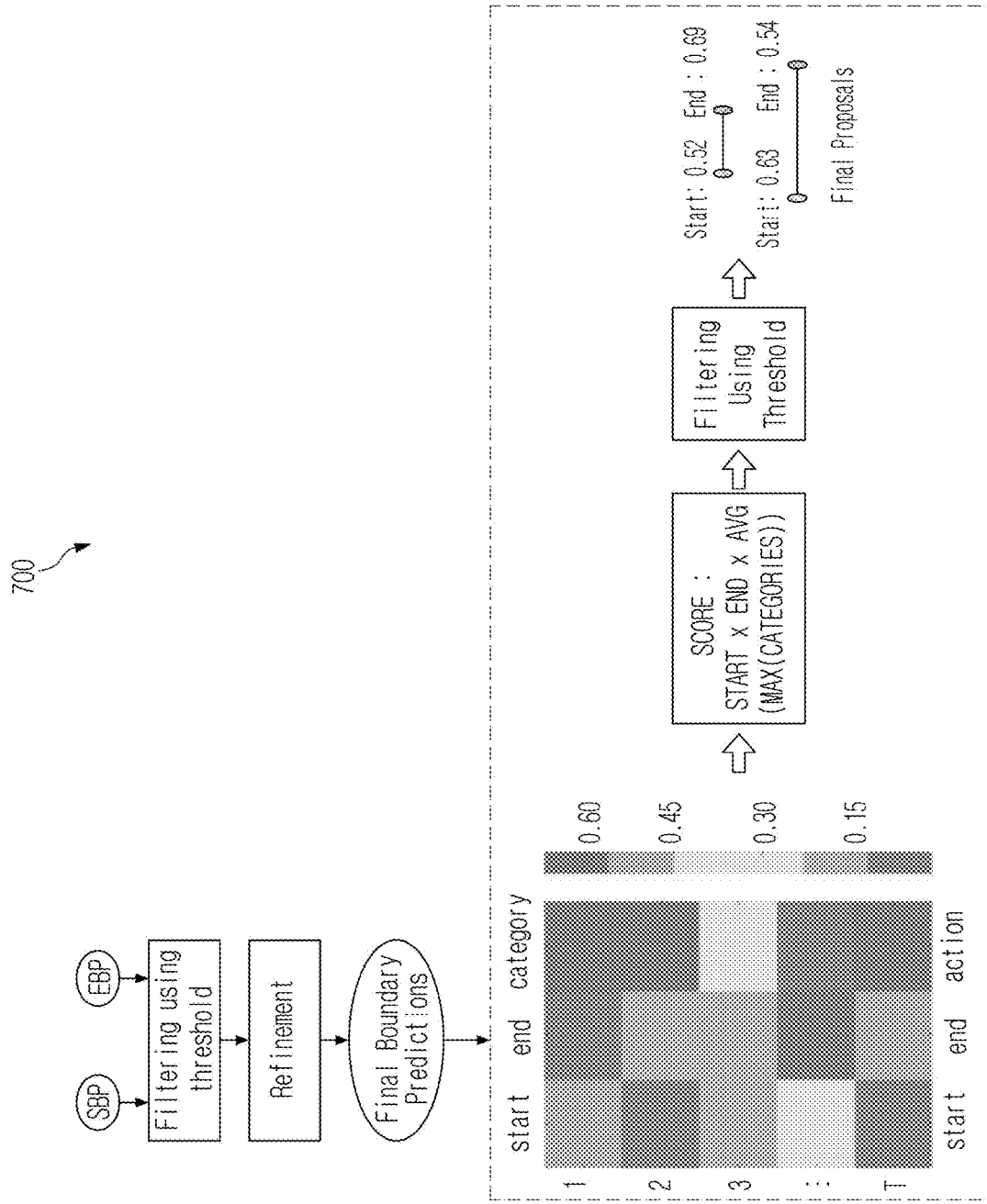
FIG. 7 illustrates a Refinement and Proposal Generation Block (RPGB) in connection with FIGS. 5A and 5B, according to an embodiment of the disclosure.

FIG. 7 illustrates the Refinement and Proposal Generation Block (RPGB) 700 in connection with FIGS. 5A and 5B, according to an embodiment of the disclosure.

Referring to FIG. 7, Start Boundary Probabilities (SBP) and End Boundary (EBP) Probabilities are taken as the input. The SBPs and EBPs are given to the Filtering using threshold (FUT) block. All temporal locations where the boundary probability is greater than specific value (e.g., 0.6 or the like) are added into the final predictions list. The final predictions list is then forwarded to the Refinement Block. All boundaries "x" for which "x−1" is also a boundary are popped from the final predictions list. The system generates proposals by combining each pair of temporal boundaries and evaluate their corresponding scores by multiplying start, and end probabilities with the average action probability. Further, a threshold is applied on these proposal scores to obtain the final set of proposals.

Figure 8:
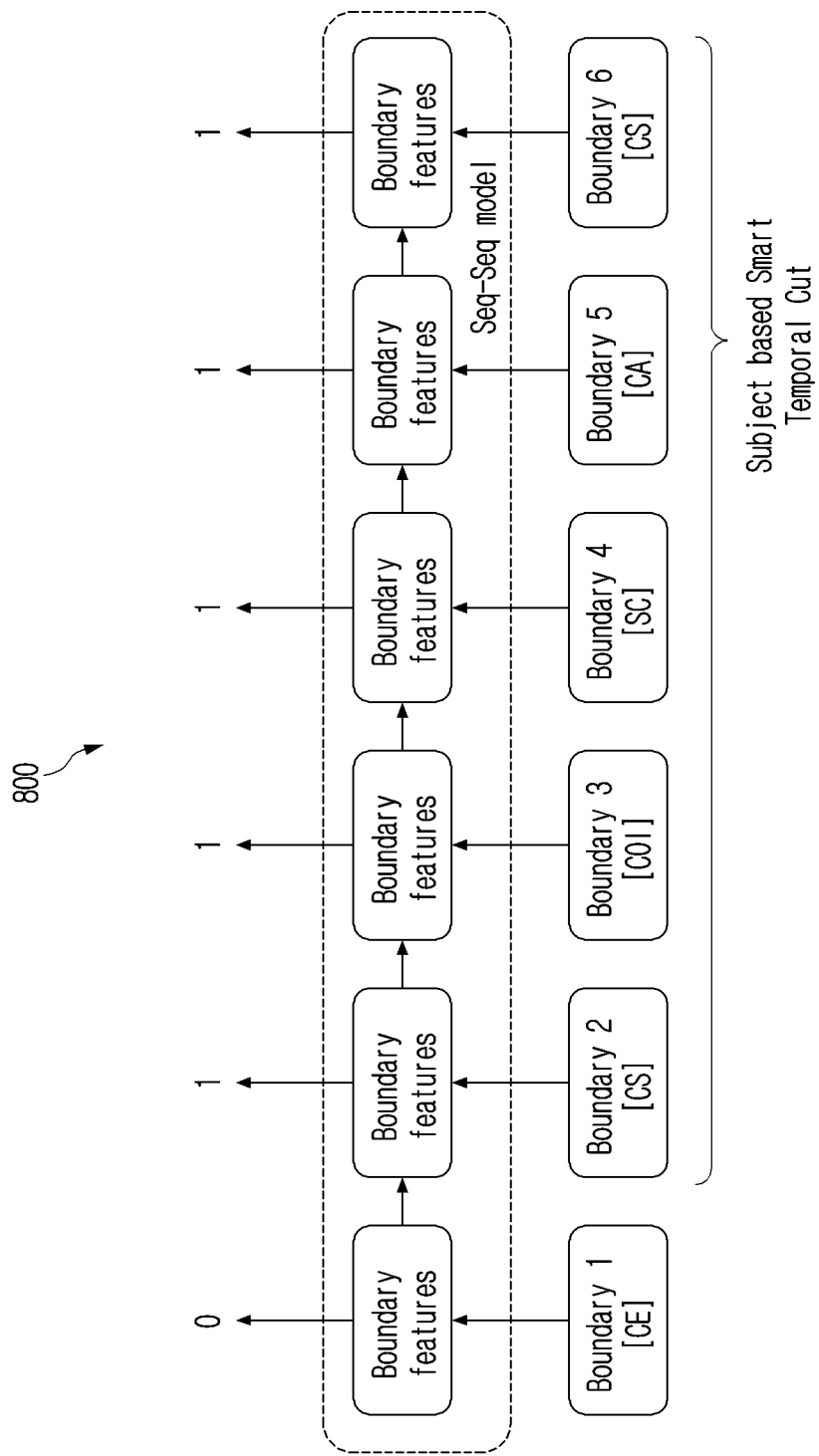
FIG. 8 illustrates a smart temporal cut block based on a subject in connection with FIGS. 5A and 5B, according to an embodiment of the disclosure.

FIG. 8 illustrates a smart temporal cut block 800 based on the subject in connection with the FIGS. 5A and 5B, according to an embodiment of the disclosure.

Referring to FIG. 8, sequence to sequence model takes Boundary features as input. The boundary features are obtained from a Boundary Prediction Block (BPB) block as dimension [T, 256] where T is the length of boundary. The model predicts subject or action or environment based smart temporal cut. The model units which should be part of temporal cut give 1 as output.

Types of Boundaries, for example but not limited to, are as follows:
1. Change of Environment (CE): Significant changes in color or brightness of the dominant subject.
2. Change of Subject (CS): New subject appears or old subject
disappears.
3. Change of Object of Interaction (COI): Subject starts interacting with a new object.
4. Change of Action (CA): New action starts or old action ends.
5. Shot Change (SC): Shot transitions due to video editing such as scene cuts, fades, panning etc.

Figure 9:
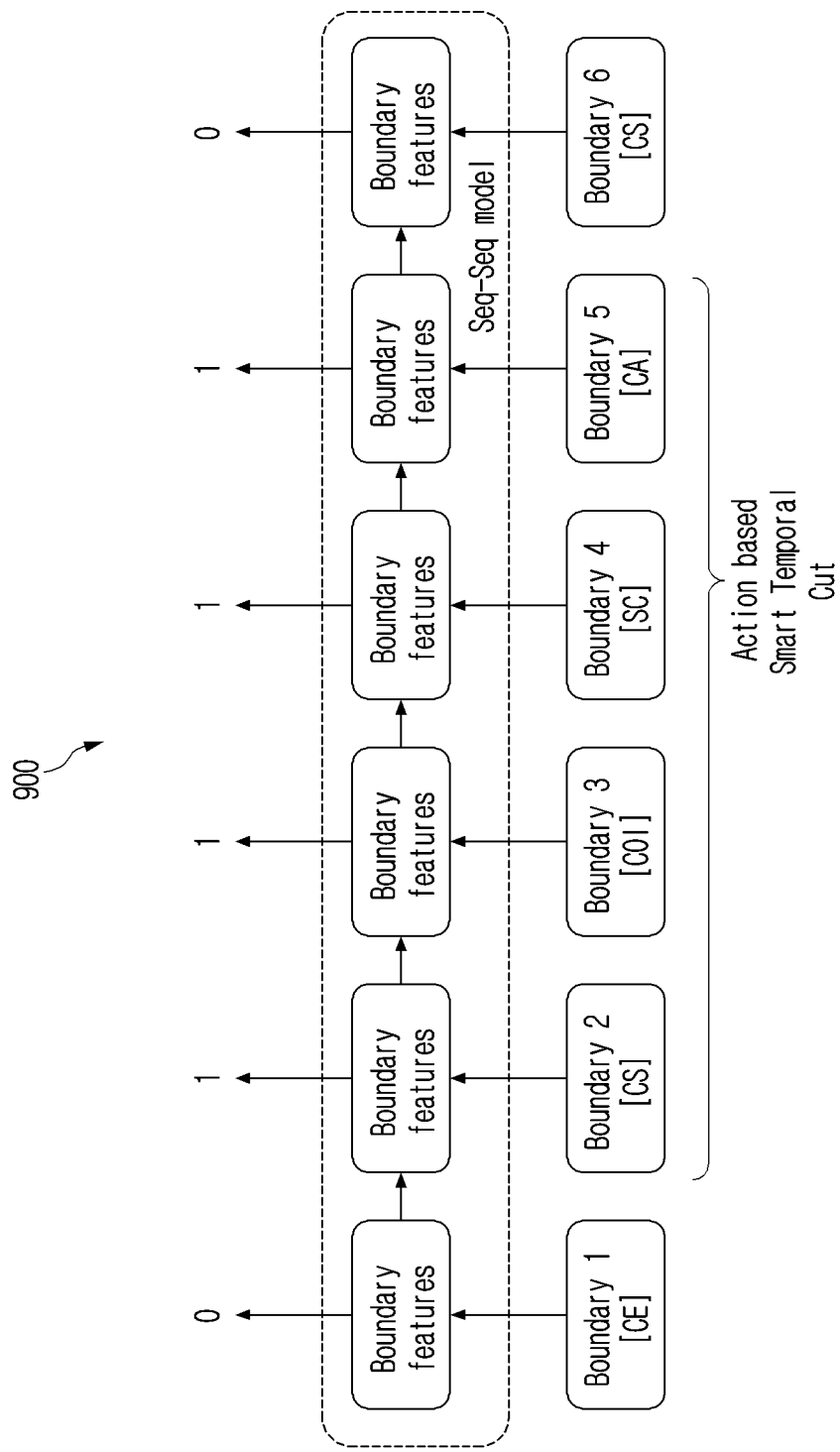
FIG. 9 illustrates a smart temporal cut block based on an action in connection with the FIGS. 5A and 5B, according to an embodiment of the disclosure.

FIG. 9 illustrates 900 the smart temporal cut block based on the action in connection with the FIGS. 5A and 5B, according to an embodiment of the disclosure.

Referring to FIG. 9, the sequence to sequence model takes boundary features as input. The boundary features are obtained from the BPB block as dimension [T, 256] where T is the length of boundary. The model predicts subject or action or environment based smart temporal cut. The model units which should be part of Temporal cut give 1 as output.

Types of Boundaries, for example but not limited to, are as follows:
1. Change of Environment (CE): Significant changes in color or brightness of the dominant subject.
2. Change of Subject (CS): New subject appears or old subject disappears.
3. Change of Object of Interaction (COI): Subject starts interacting with a new object.
4. Change of Action (CA): New action starts or old action ends.
5. Shot Change (SC): Shot transitions due to video editing such as scene cuts, fades, panning etc.

Figure 10:
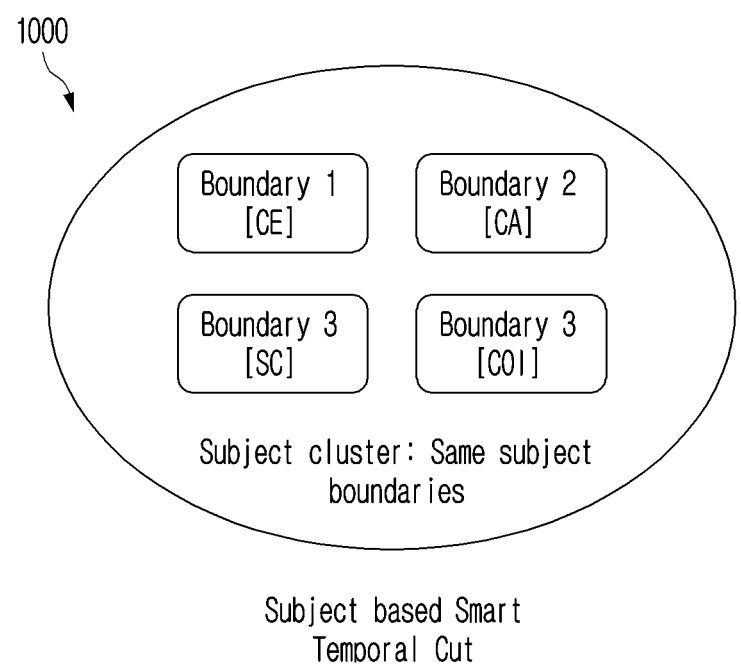
FIGS. 10 and 11 illustrate a smart temporal cut block based on a cluster in connection with the FIGS. 5A and 5B, according to various embodiments of the disclosure.
Figure 11:
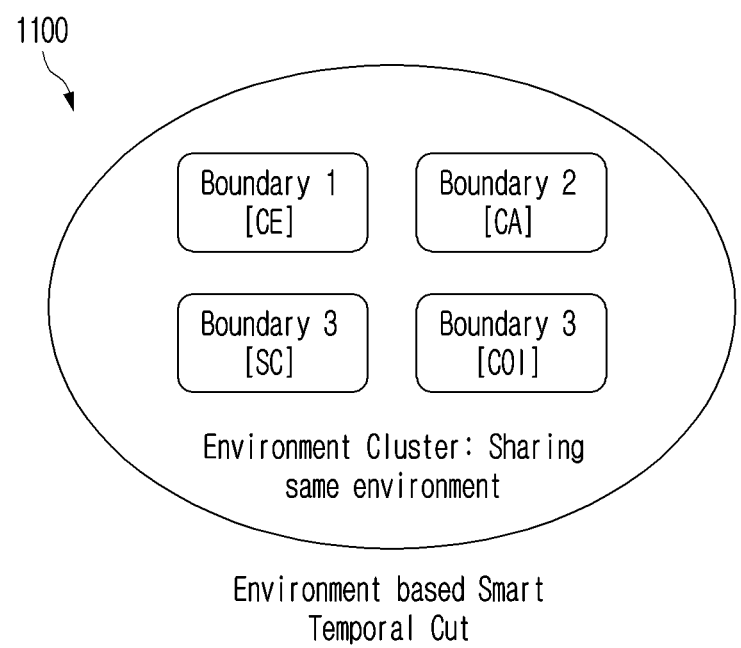

FIGS. 10 and 11 illustrate (1000 and 1100) a smart temporal cut block based on a cluster in connection with the FIGS. 5A and 5B, according to various embodiments of the disclosure.

Referring to FIGS. 10 and 11, multi-dimensional fuzzy clustering is disclosed. The features are based on type of boundary, subject for change of subject boundary, action for Change of action etc. The boundary can belong to multiple clusters like the subject change boundary can also be in cluster based on environment. Boundaries from a cluster are temporally concatenated to create Smart Temporal Cut.

Types of Boundaries, for example but not limited to, are as following:
1. Change of Environment (CE): Significant changes in color or brightness of the dominant subject.
2. Change of Subject (CS): New subject appears or old subject disappears.
3. Change of Object of Interaction (COI): Subject starts interacting with a new object.
4. Change of Action (CA): New action starts or old action ends.
5. Shot Change (SC): Shot transitions due to video editing such as scene cuts, fades, panning etc.

Figure 12:
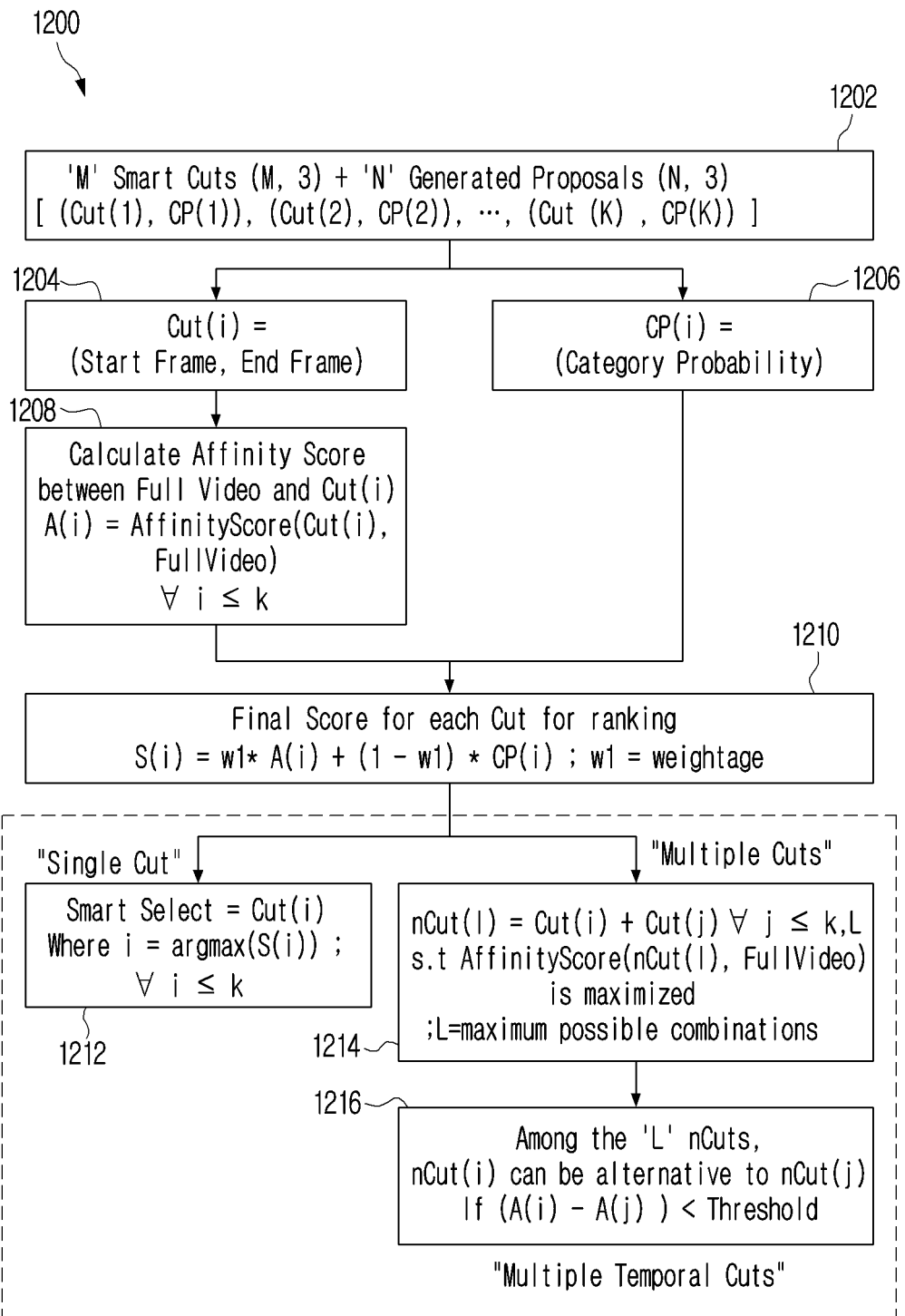
FIG. 12 illustrates ranking of temporal cuts in connection with FIGS. 5A and 5B, according to an embodiment of the disclosure.

FIG. 12 illustrates a flowchart 1200 of ranking temporal cuts in connection with the FIGS. 5A and 5B, according to an embodiment of the disclosure.

At operation 1202, the electronic device 100 obtains the 'M' Smart Cuts (M, 3)+'N' Generated Proposals (N, 3) [(Cut(1), CP(1)), (Cut(2), CP(2)), . . . , (Cut(K), CP(K))]. At operation 1204, the electronic device 100 determines the cut (i) including the start frame and the end frame. At operation 1206, the electronic device 100 computes the category probability (CP).

At operation 1208, the electronic device 100 computes the affinity score between the full video and the cut based on the determined cut and the computed category probability (i.e., A(i)=AffinityScore (Cut(i), FullVideo); $\forall i \leq k$). At operation 1210, the electronic device 100 determines the final score for each cut for ranking. At operation 1212, the electronic device 100 predicts the single cut. In an example, the single cut means after ranking if the single cut gets the highest score, then the cut is suggested as intelligent temporal segment. Depending on the type of action to be taken, if the action demands single cut in that case as well, the single cut is returned.

At operation 1214, the electronic device 100 predicts the multiple cuts. In case, there are n cuts that got created and every cut has a score denoted by Cut(i). The score for every combination of the cuts is also calculated as nCut(I)=Cut (i)+Cut(j) where j belongs to all possible cut indexes other than i. The score nCut(I) is maximized to get the best possible segment which forms by combination of multiple cuts. This ensures that the important parts of video are never ignored while creating intelligent temporal segment.

At operation 1216, the electronic device 100 predicts the multiple temporal cuts. In an example, if the difference of the affinity score A(i) and A(j) is less than a threshold, then such cuts are can be given as alternative final cuts. These cuts can be from operation 1212 or 1214.

Figure 13A:
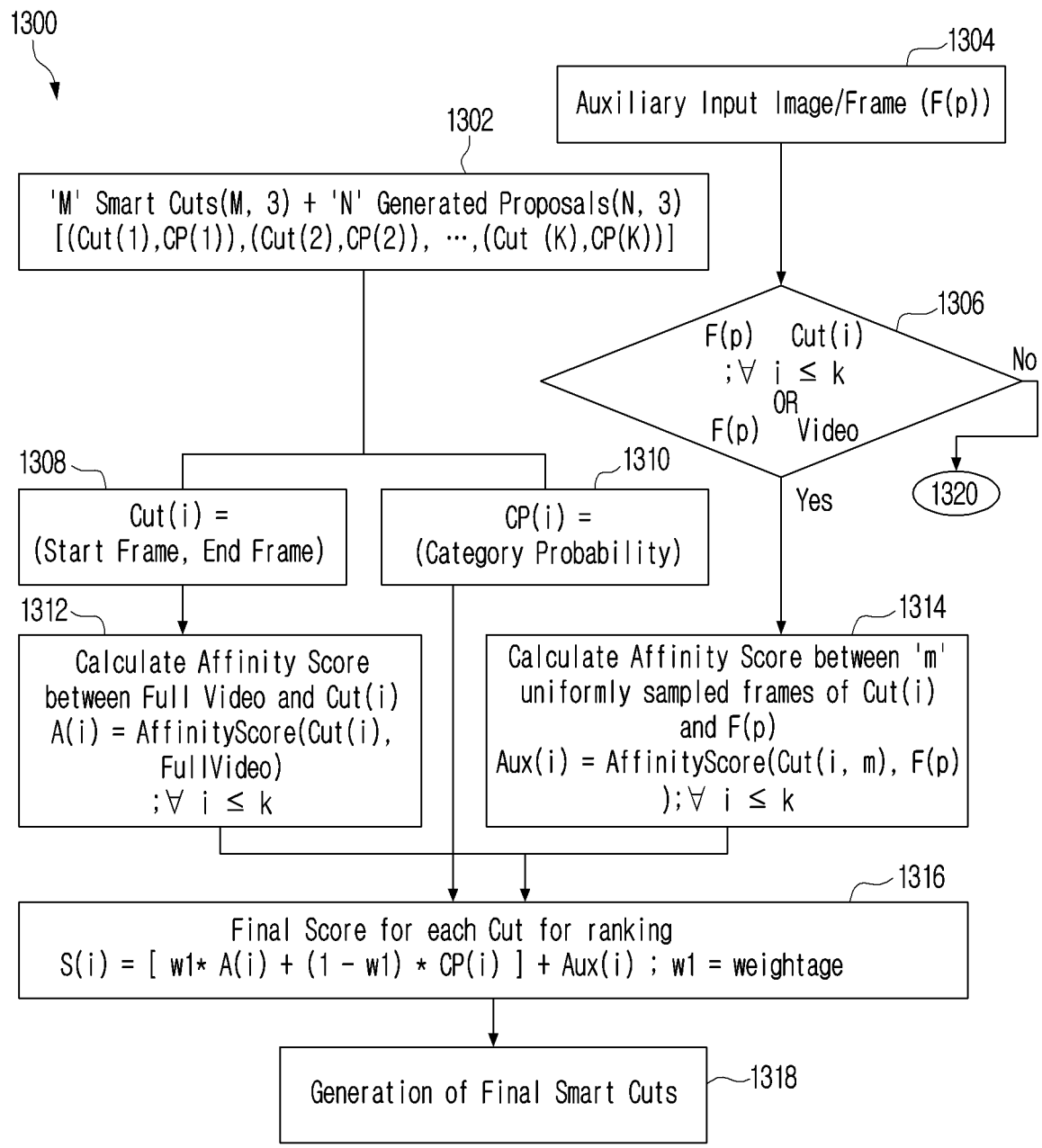
FIGS. 13A and 13B illustrate ranking of temporal cuts in connection with FIGS. 5A and 5B, according to various embodiments of the disclosure.
Figure 13B:
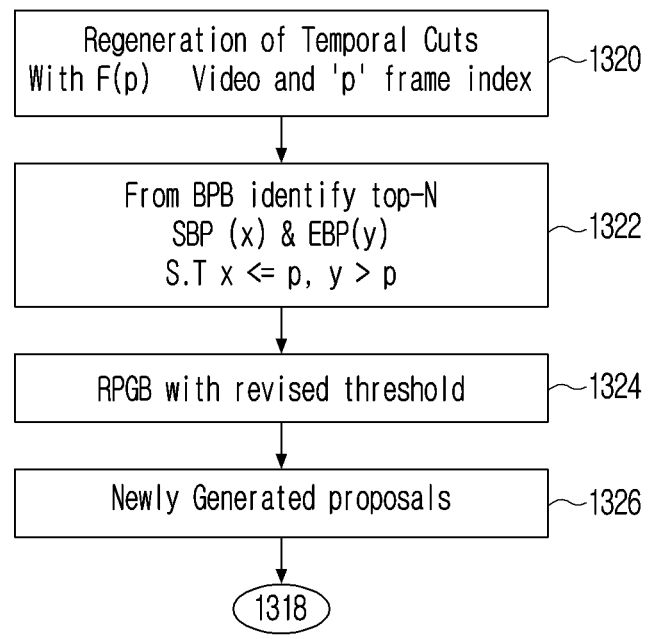

FIGS. 13A and 13B illustrate 1300 ranking of the temporal cuts in connection with FIGS. 5A and 5B, according to various embodiments of the disclosure.

At operation 1302, the electronic device 100 obtains the 'M' Smart Cuts (M, 3)+'N' Generated Proposals (N, 3) [(Cut(1), CP(1)), (Cut(2), CP(2)), . . . , (Cut(K), CP(K))]. At operation 1304, the electronic device 100 obtains the auxiliary input image/frame (F(p)). In an example, the user of the electronic device 100 paused the video (frame) and took screenshot. In another example, the user of the electronic device (100) watches a part of video multiple times (frame (s)) and shares the video.

At operation 1306, the electronic device 100 determines whether the auxiliary input F(p) is part of any of the cuts i where i is less than equal to k OR F(p) is not part of the video. In case the auxiliary input belongs to the cut then, the electronic device 100 computes the affinity score of auxiliary input with the cut to which the auxiliary input belongs by uniformly sampling m frames from the cut. Alternatively, if the auxiliary input is not part of the input video, the electronic device 100 ignores the auxiliary input.

At operation 1308, the electronic device 100 determines the cut (i) including the start frame and the end frame. At operation 1310, the electronic device 100 computes the category probability (CP). At operation 1312, the electronic device 100 computes the affinity score between the full video and the cut based on the determined cut and the computed category probability (i.e., A(i)=AffinityScore (Cut (i), Full Video); $\forall i \leq k$).

At operation 1314, the electronic device 100 calculates the affinity score between 'm' uniformly sampled frames of Cut(i) and F(p) (i.e., Aux(i)=AffinityScore (Cut(i, m), F(p)); $\forall i \leq k$). In case the auxiliary input belongs to the cut, the electronic device 100 computes the affinity score of the auxiliary input with the cut to which auxiliary input belongs by uniformly sampling m frames from the cut.

At operation 1316, the electronic device 100 determines the final score for each cut for ranking (i.e., S(i)=[w1*A(i)+

(1−w1)*CP(i)]+Aux(i); w1=weightage]. The final score for the cut is weighted sum of the affinity score of cut with respect to the input video, the category probability for cut and the auxiliary score provided from the operation 1314. At operation 1318, the electronic device 100 generates the final smart cuts. At operation 1320, the electronic device 100 regenerates the temporal the temporal cuts.

At operation 1322, in case the auxiliary input (F(p) where p is frame index is part of the input video but not part of any cut, the top N start boundaries and end boundaries are filtered such that Start boundary frame index is <=p and End Boundary frame index>p, such that the electronic device (100) obtains the boundaries where p is within start boundary and end boundary. At operation 1324, the electronic device 100 provides the RPGB with revised threshold. At operation 1326, the electronic device 100 notifies the newly generated proposals.

Figure 14:
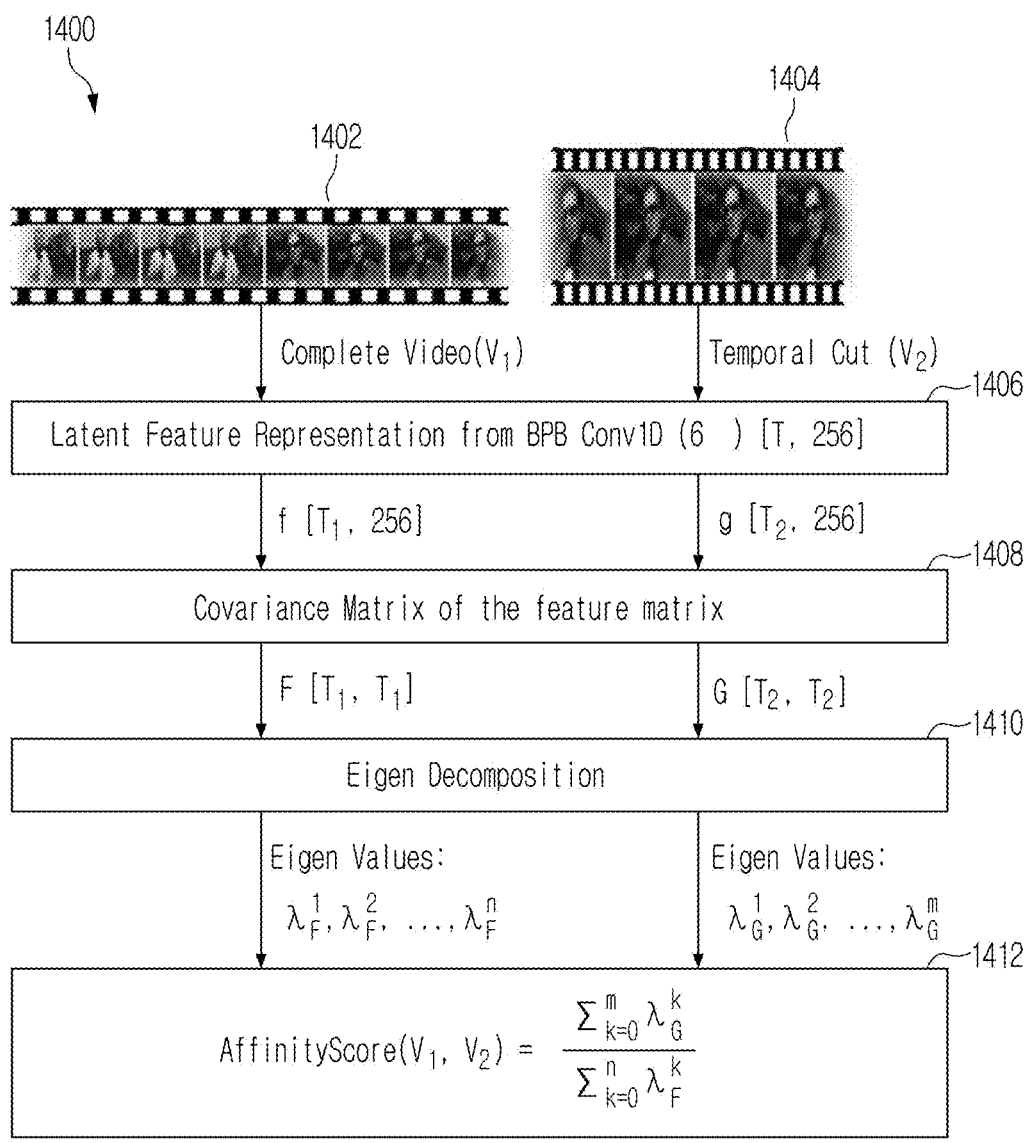
FIG. 14 is a flowchart illustrating a method for computing an affinity score while generating the at least one segment of the video, according to an embodiment of the disclosure.

FIG. 14 illustrates a flowchart 1400 for calculating the affinity score, according to an embodiment of the disclosure. The AffinityScore ( ) calculates the explained variance ratio of smart-cut with respect to full video.

At operation 1402, the electronic device 100 obtains the complete video (V1). At operation 1404, the electronic device 100 obtains the temporal cut (V$_2$). At operation 1406, the electronic device 100 performs the latent feature representation from BPB Conv1D (6$^{th}$) [T, 256]. The Boundary Prediction Block (BPB) processes input videos and provides 256 dimensional features for all T frames. The [T, 256] dimensional feature matrix from the input video and the temporal cut are sent to operation 1408.

At operation 1408, the electronic device 100 performs the covariance matrix of the feature matrix. At operation 1410, the electronic device 100 performs the Eigen Decomposition. The Eigen Decomposition of a matrix is done to represent the matrix from operation 1408 as eigenvalues and eigenvectors.

At operation 1412, the electronic device 100 determines the affinityScore $$(V_1, V_2) = \frac{\sum_{k=0}^{m} \lambda_G^k}{\sum_{k=0}^{n} \lambda_F^k}.$$

The Affinity score is ratio of sum of eigenvalues from cut and input video.

Figure 15A:
FIG. 15A is an example scenario in which a smart selection on the video is not available and taking screenshot on a video bringing an image based the smart selection, according to the prior art.

FIG. 15A is an example scenario in which a smart selection on the video is not available and taking screenshot on the video brings/provides the image based the smart selection, according to the related art.

Referring to FIG. 15A, in the related art, the boundary category and boundary of video segment are detected based on the video auxiliary state (e.g., current focus or the like).

Figure 15B:
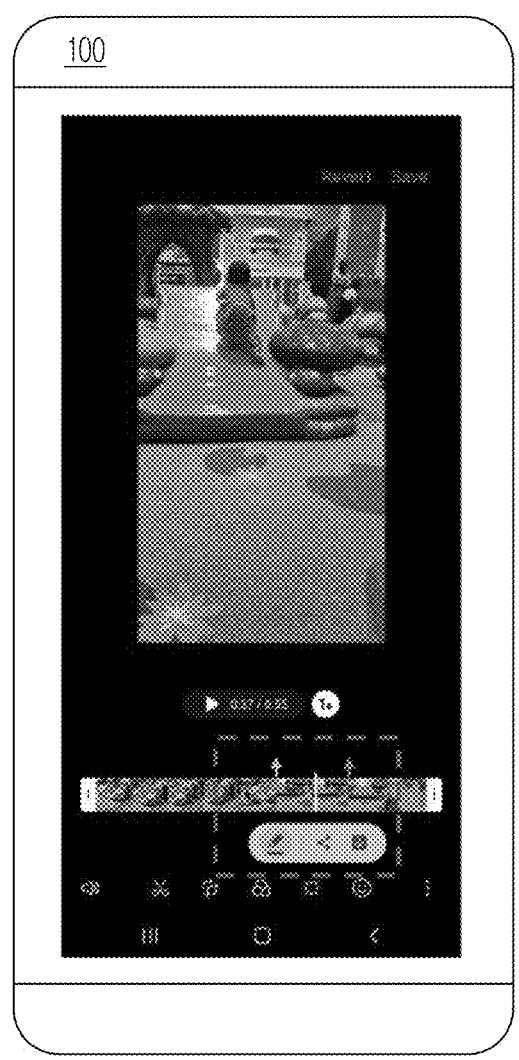
FIG. 15B is an example scenario in which smart selection on the video provides a way to get the temporal aware video cuts based on the image in a screenshot, according to an embodiment of the disclosure.

FIG. 15B is an example scenario in which the smart selection on the video will provide the way to obtain the temporal aware video cuts based on the image in the screenshot, according to an embodiment of the disclosure.

Referring to FIG. 15B, in the proposed method, the intelligent temporal segment is provided based on the screenshot image. The proposed method uses the boundary category (e.g., change in the subject, the environment, the object of interaction, the shot, the action or the like) based segment and easily tap and download video segment. The segments will have titles/caption as per subject, action, environment etc.

In other words, the user of the electronic device 100 interacts with the video (i.e., paused the video) and frame of interest identified/extracted (consider as auxiliary input). The user takes screenshot on the video. The auxiliary input frame is considered to reflect user interaction to the segmentation and final score of each cut calculated/adjusted by considering the auxiliary context (e.g., frame with auxiliary input gets higher score). The video screenshot is created based on the ranking.

Figure 16A:
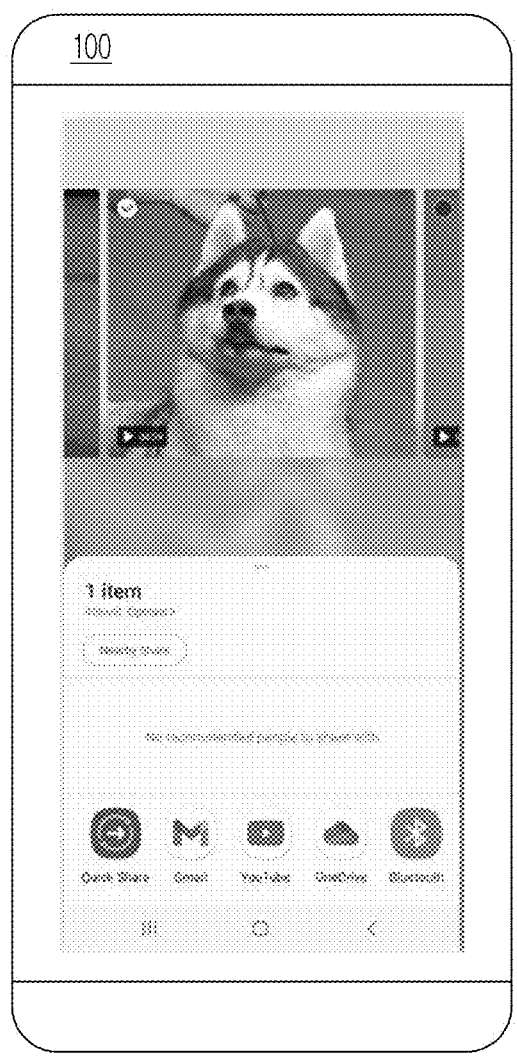
FIG. 16A is an example scenario in which a sharing video event is depicted, according to the prior art.

FIG. 16A is an example scenario in which the sharing video is depicted, according to the related art.

Referring to FIG. 16A, in the related art, the existing video shares the full video content.

Figure 16B:
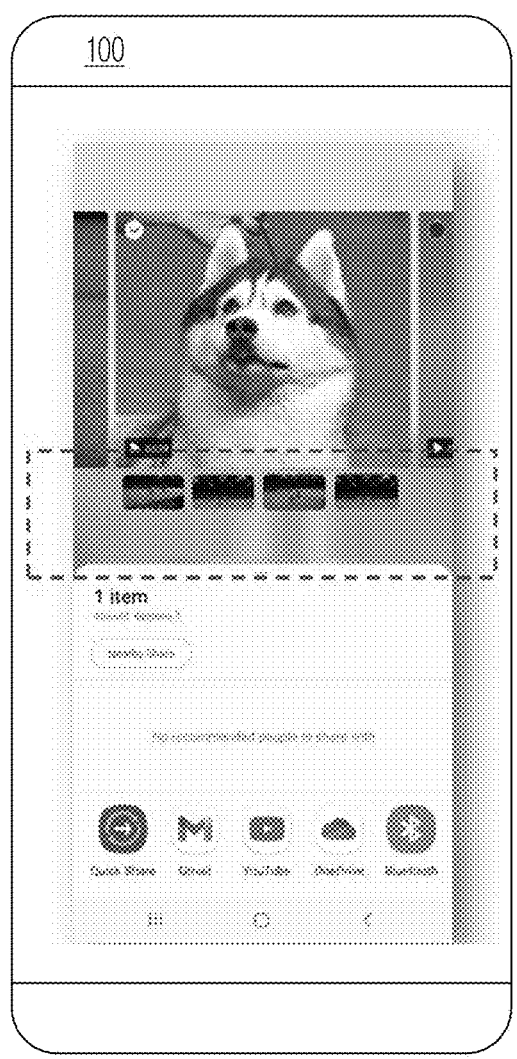
FIG. 16B is an example scenario in which the smart video suggestions are depicted, according to an embodiment of the disclosure.

FIG. 16B is an example scenario in which the smart video suggestions is depicted, according to an embodiment of the disclosure.

Referring to FIG. 16B, the proposed method provides individualized and intelligent temporal segments (i.e., video clips) suggestion, while sharing the video on the electronic device 100. The proposed method previews and sends the user preferred video clips 1602, instead of sharing complete videos.

In other words, the user views the same parts of a video, multiple times (consider as auxiliary input context). Further, the user triggers sharing of the video. Based on the proposed method, the electronic device 100 automatically identifies the auxiliary context based on interaction/action, and change (prioritize) the segmentation result accordingly.

Figure 17A:
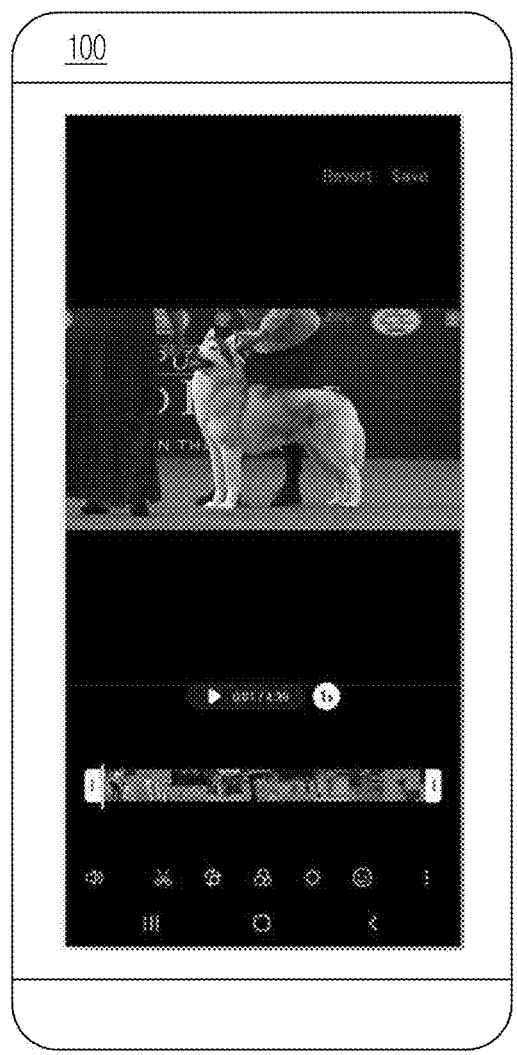
FIG. 17A is an example scenario in which a boundary detection event is not supported, according to the prior art.

FIG. 17A is an example scenario in which the boundary detection is not supported, according to the related art.

Figure 17B:
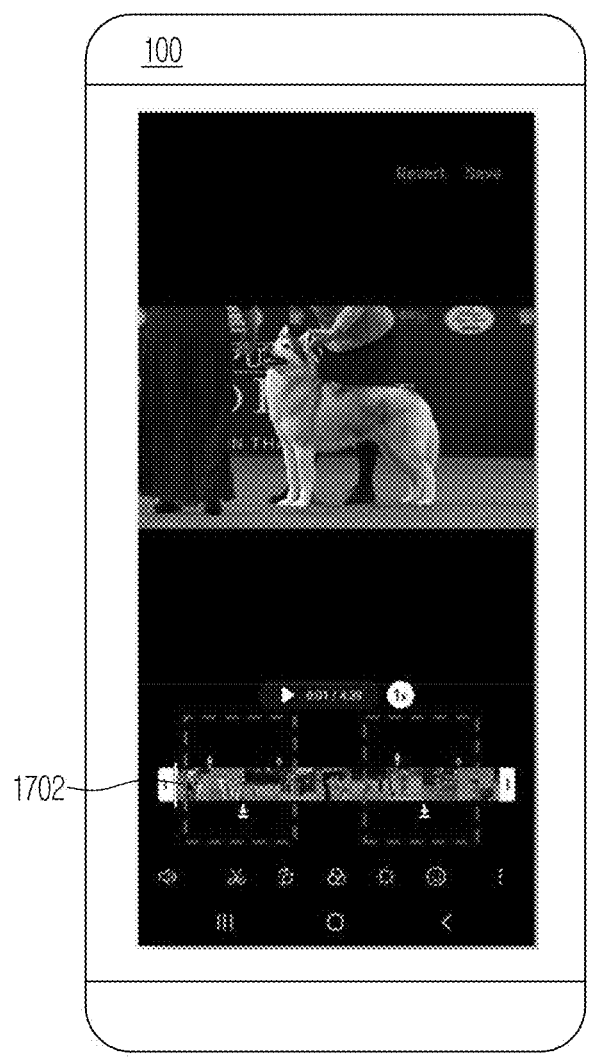
FIG. 17B is an example scenario in which the boundary detection event is depicted, according to an embodiment of the disclosure.

FIG. 17B is an example scenario in which the boundary detection is depicted, according to an embodiment of the disclosure.

Referring to FIGS. 17A and 17B, the proposed method provides the intelligent temporal segment suggestion (i.e., video cut 170)) in a video editor. The proposed system allows the easily tap and download video clips.

Figure 18A:
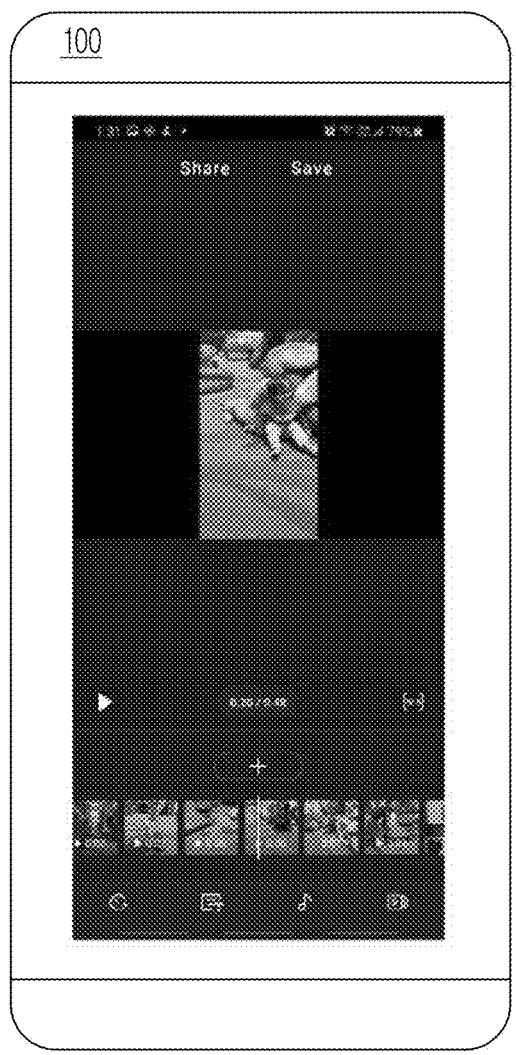
FIG. 18A is an example scenario in which a story video activity is depicted, according to the prior art.

FIG. 18A is an example scenario in which a story video is depicted, according to the related art.

Referring to FIG. 18A, In the existing methods of the related art, a start of video is mostly considered for the temporal segments.

Figure 18B:
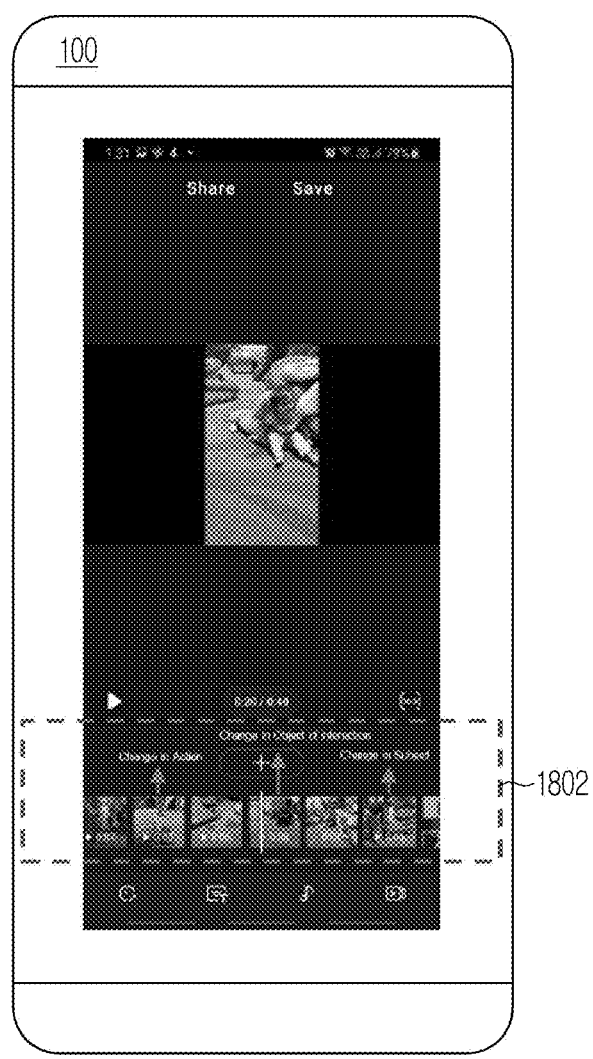
FIG. 18B is an example scenario in which the story video activity is depicted, according to an embodiment of the disclosure.

FIG. 18B is an example scenario in which story video is depicted, according to an embodiment of the disclosure.

Referring to FIG. 18B, the proposed method provides the stories 1802 based on intelligent temporal segments. The proposed method supports the boundary category (e.g., change in subject, environment, object of interaction, shot, action) based on the segments. The method allows the easily tapping and downloading the video clips. The segments will have titles/caption as per subject, action, environment etc.

Figure 19:
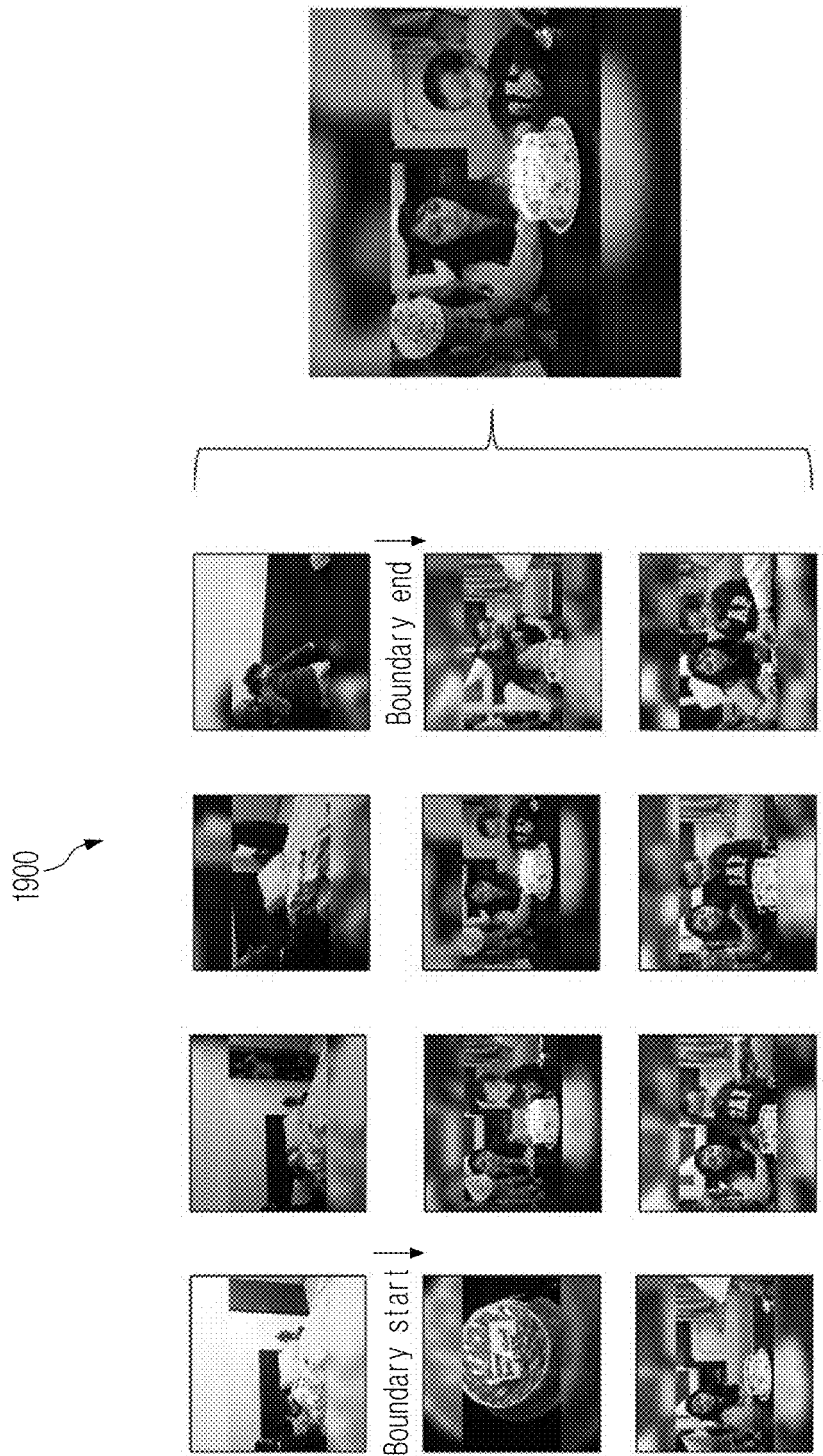
FIG. 19 is an example scenario in which single cut smart selection is depicted, according to an embodiment of the disclosure.

FIG. 19 is an example scenario 1900 in which the single cut smart selection is depicted, according to an embodiment of the disclosure.

Figure 20:
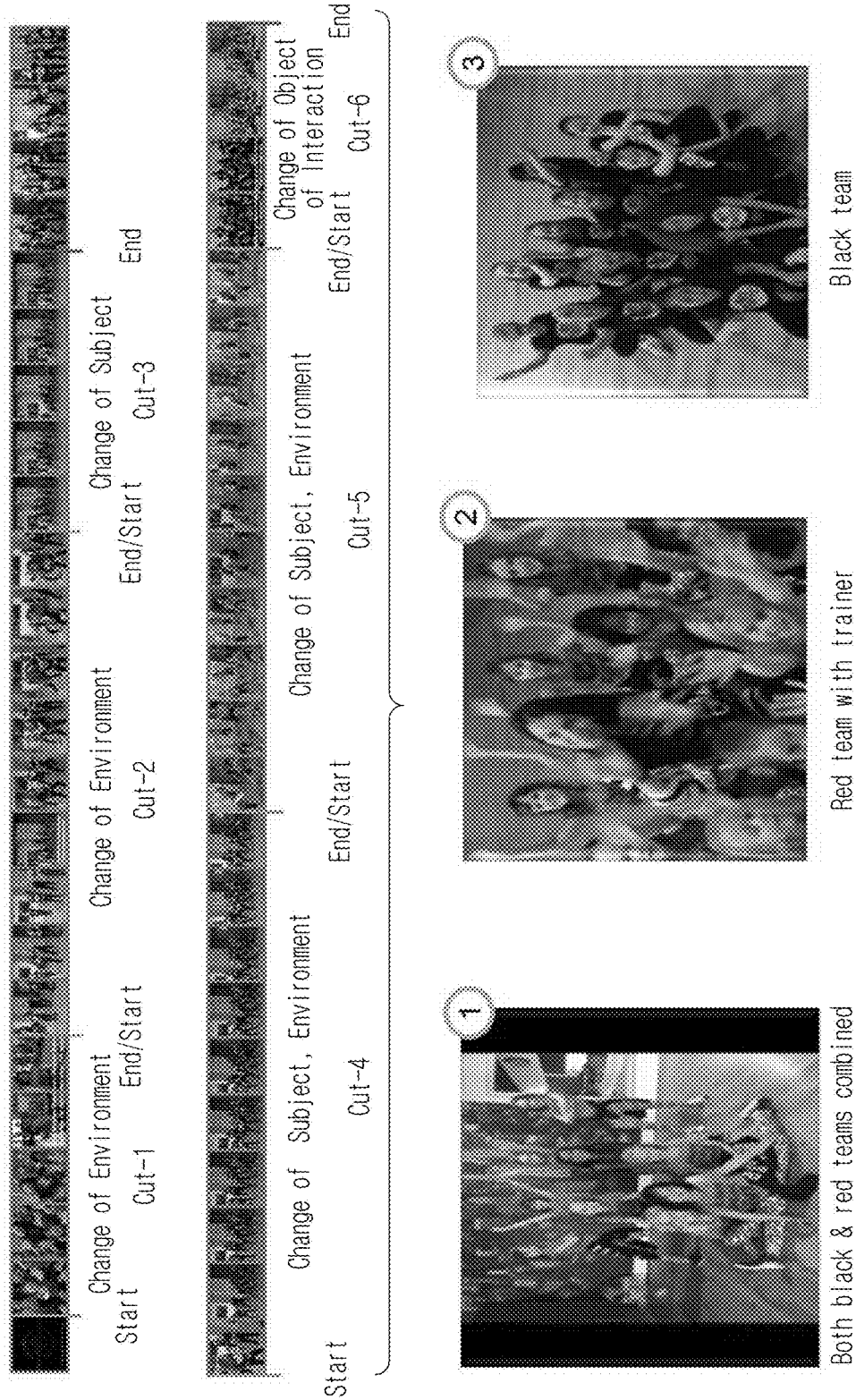
FIG. 20 is an example scenario in which multiple temporal cuts with ranking is depicted, according to an embodiment of the disclosure.

FIG. 20 is an example scenario (2000) in which multiple temporal cuts with ranking is depicted, according to an embodiment of the disclosure.

Referring to FIG. 20, the operations of the ranking are already defined. For the sake of brevity, we are not repeating the same operations. In an example, three smart-select candidates are provided with ranking. The ranking is based on the combination of the black and red teams, the red team only, and the black team only.

Figure 21:
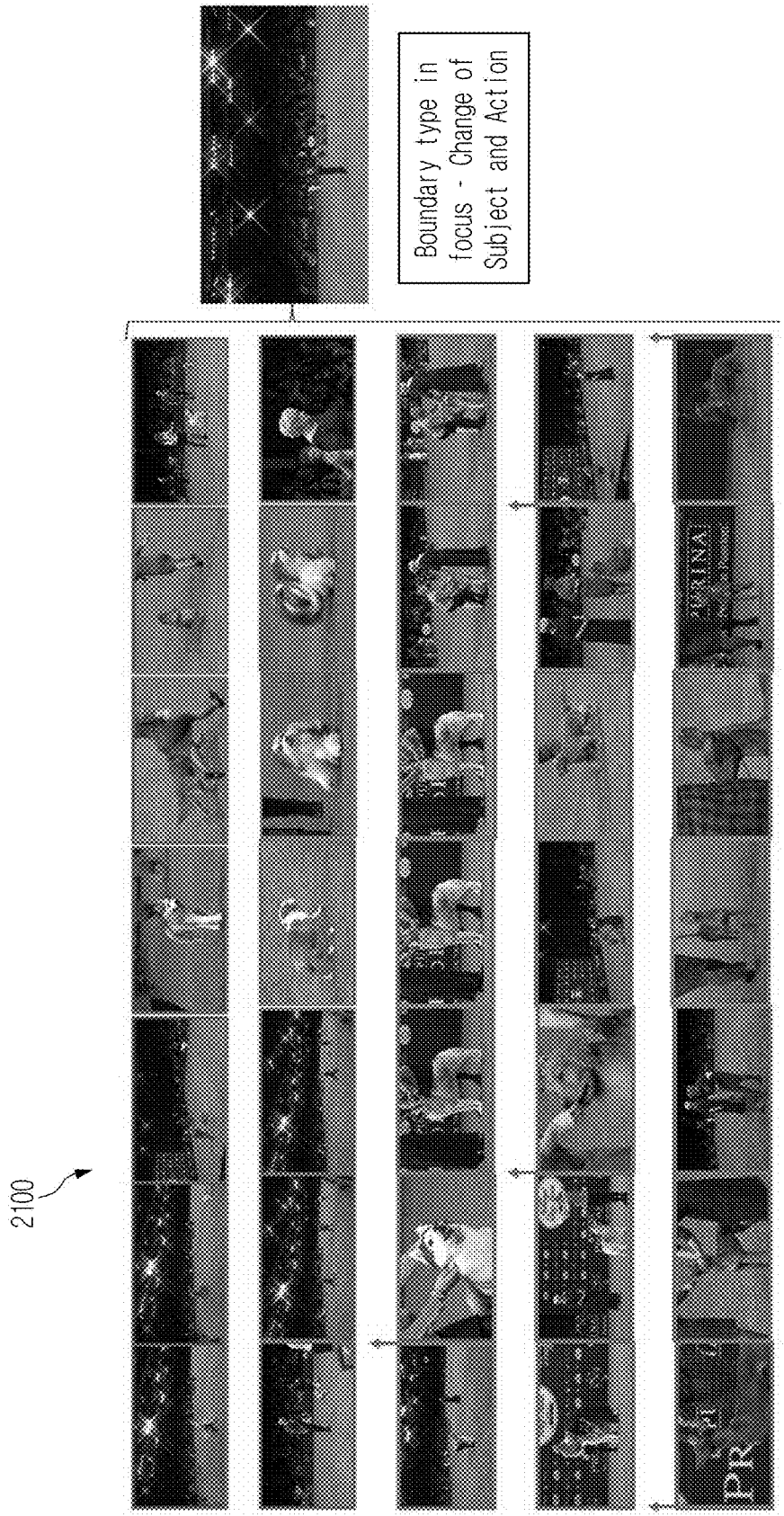
FIG. 21 is an example scenario in which subject and action change based smart selection is depicted, according to an embodiment of the disclosure.

FIG. 21 is an example scenario 2100 in which subject and action change based smart selection is depicted, according to an embodiment of the disclosure.

Referring to FIG. 21, the smart selection is determined based on the change of the subject and the action. The short segment is generated based on the change of the subject and the action.

Figure 22:
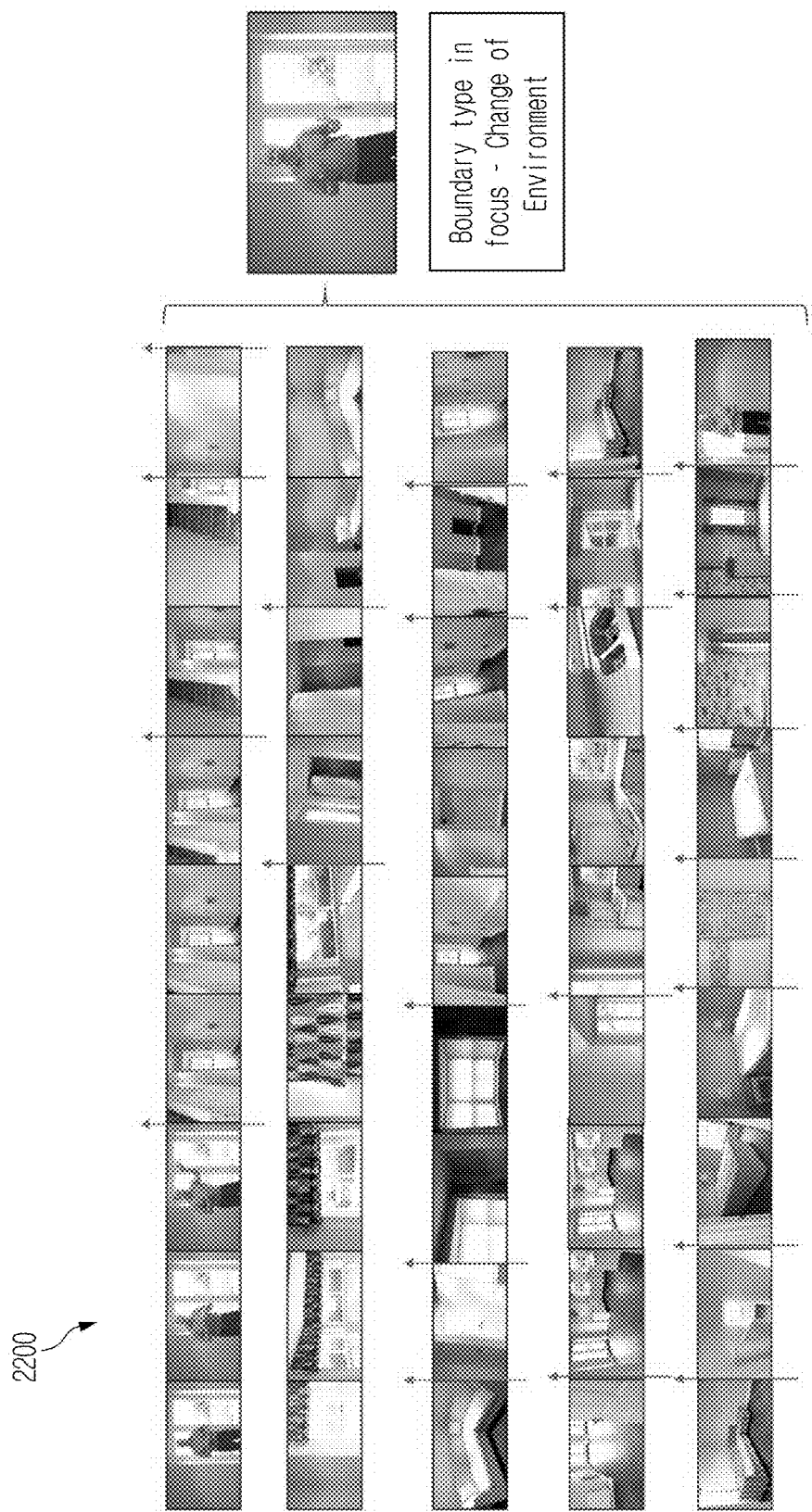
FIG. 22 is an example scenario in which environment change based smart selection is depicted, according to an embodiment of the disclosure.

FIG. 22 is an example scenario 2200 in which an environment change based smart selection is depicted, according to an embodiment of the disclosure.

Referring to FIG. 22, the smart selection is determined based on the environment change. The short segment is generated, based on the environment change.

Figure 23:
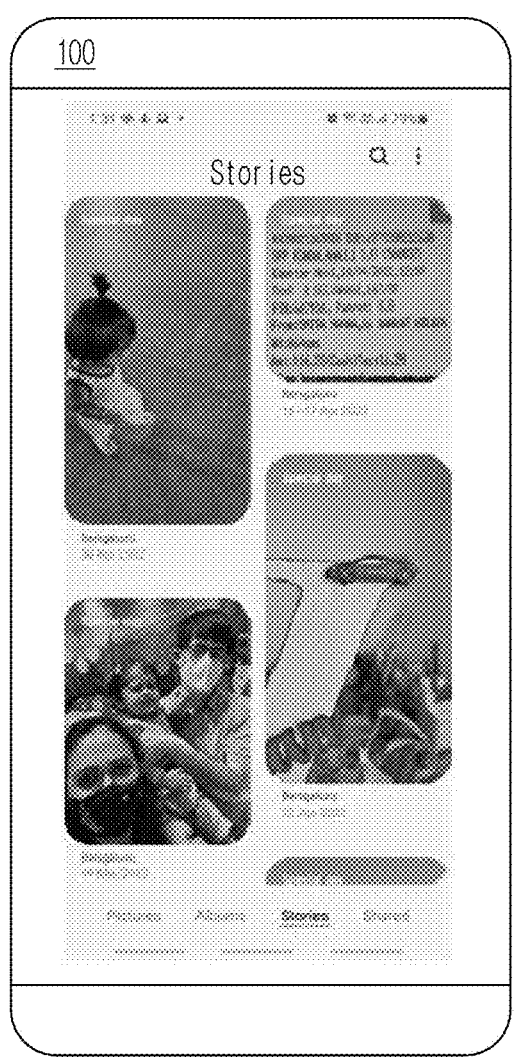
FIG. 23 is an example scenario in which the short videos in a gallery is depicted, according to an embodiment of the disclosure.

FIG. 23 is an example scenario in which the short videos in the gallery is depicted, according to an embodiment of the disclosure.

Figure 24:
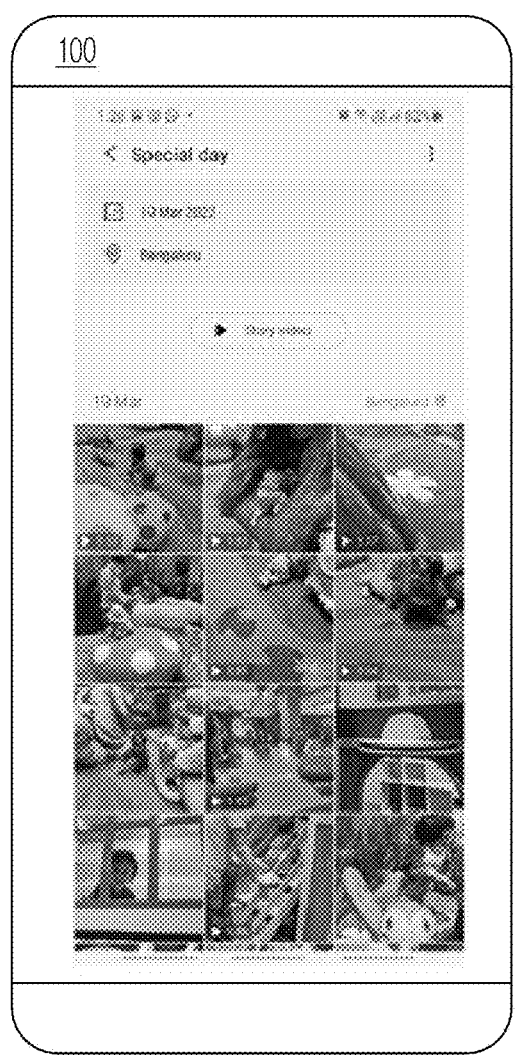
FIG. 24 is an example scenario in which the short video in a single take is depicted, according to an embodiment of the disclosure.

FIG. 24 is an example scenario in which the short video in the single take is depicted, according to an embodiment of the disclosure.

Figure 25:
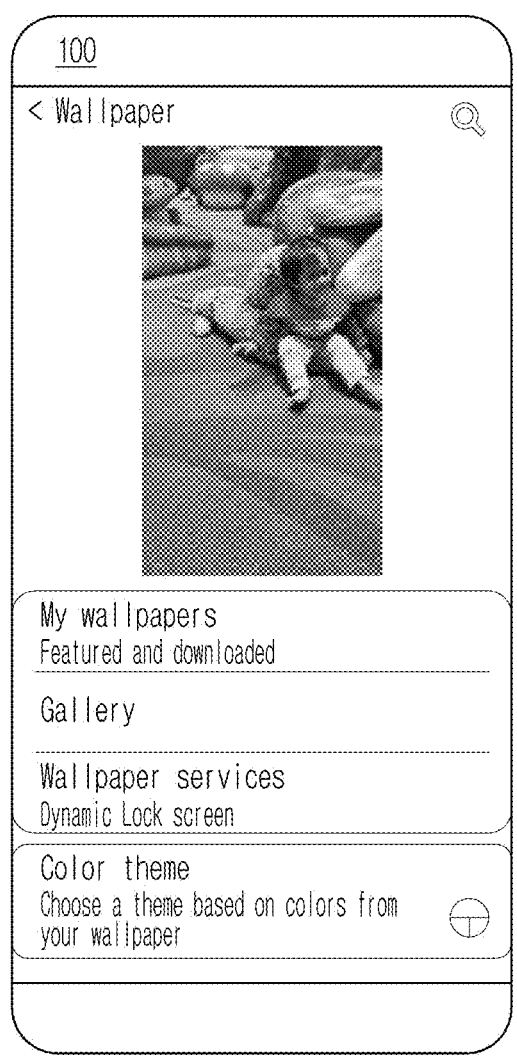
FIG. 25 is an example scenario in which the intelligent clip suggestion as wallpaper is depicted, according to an embodiment of the disclosure.

FIG. 25 is an example scenario in which the intelligent clip suggestion as wallpaper is depicted, according to an embodiment of the disclosure.

Figure 26:
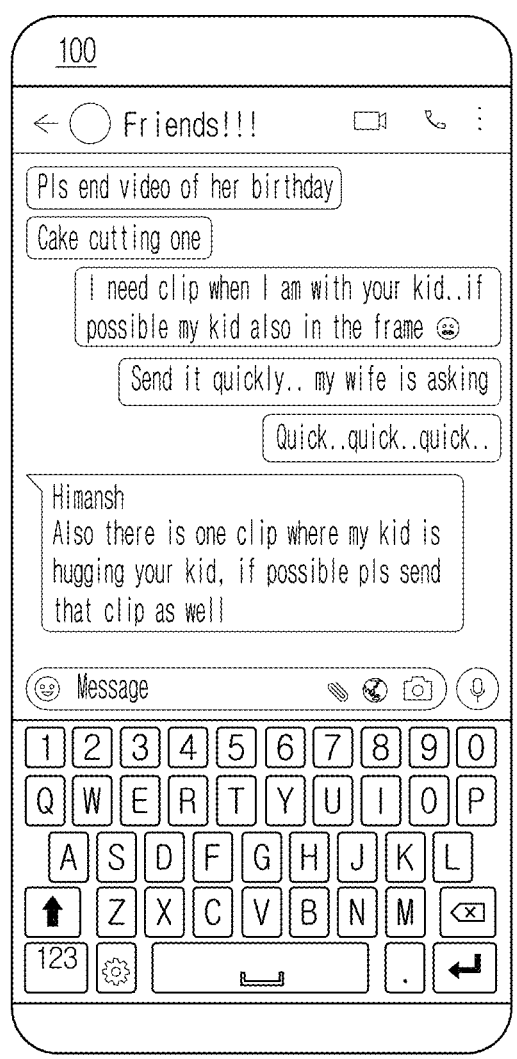
FIG. 26 is an example scenario in which intelligent clip suggestions in a keyboard is depicted based on a screen understanding, according to an embodiment of the disclosure.

FIG. 26 is an example scenario in which intelligent clip suggestions in keyboard is depicted based on the screen understanding, according to an embodiment of the disclosure.

Figure 27:
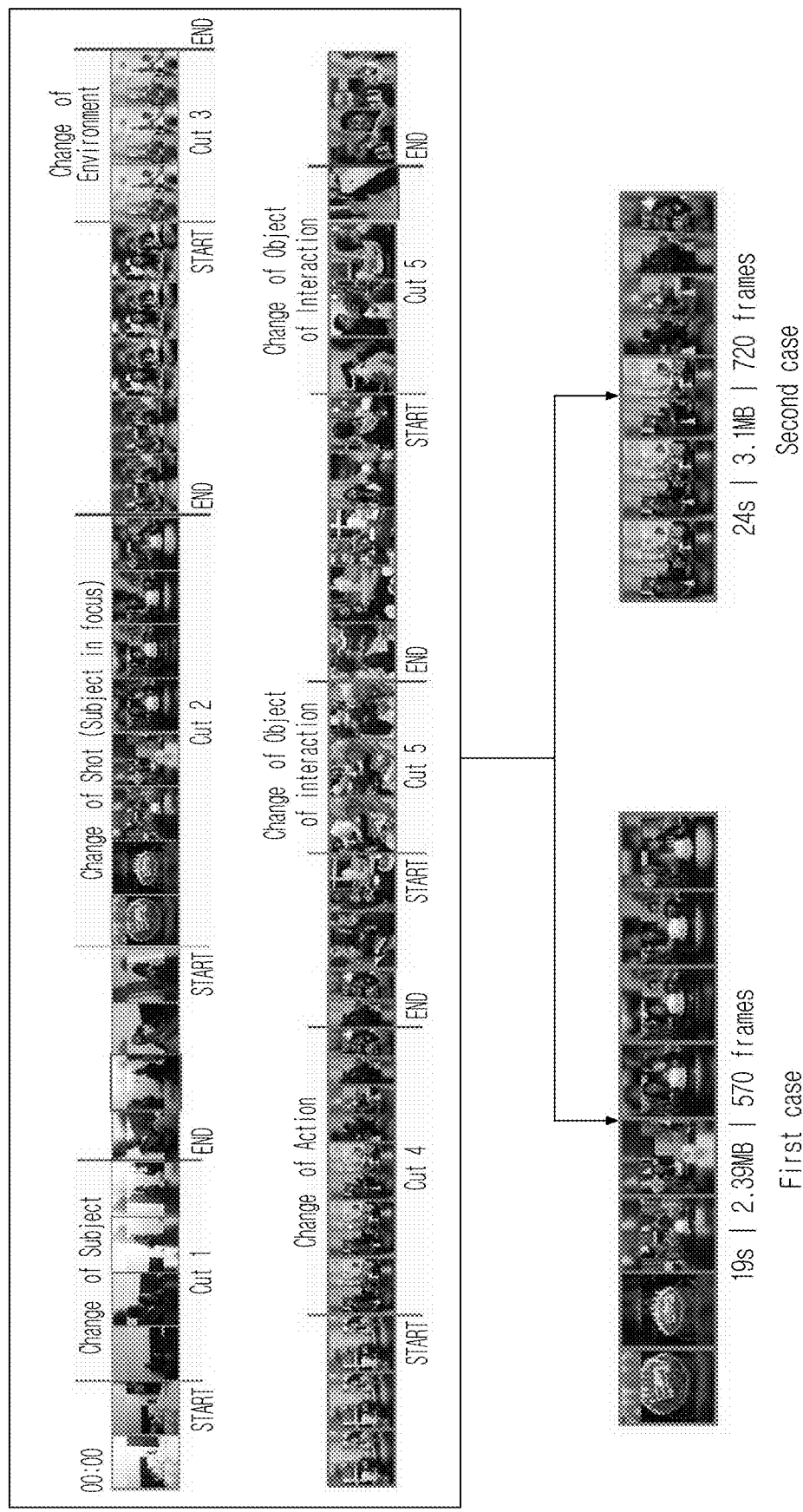
FIG. 27 is an example scenario in which the intelligent temporal segments in video is created, according to an embodiment of the disclosure.

FIG. 27 is an example scenario in which the intelligent temporal segments in video is created, according to an embodiment of the disclosure.

Referring to FIGS. 23-27, the electronic device 100 identifies the change in the subject, the shot, the environment, the action, the object of interaction for creating the intelligent temporal segments. In the first case, the frame of interest is used to extract relevant context to prioritize boundary based on the context. The frame of interest is determined by the subject and the object of interaction. In the second case, the frames of interest are used to extract relevant context to prioritize boundary based on context. The frames of interest are determined based on watching part of video multiple times and volume increase while watching the video.

The proposed method identifies change in the subject, the shot, the environment, the action, the object of interaction for creating intelligent temporal segments. Based on the proposed method, instead of sending large video, the user of the electronic device 100 shares user preferred small video cuts. This results in an improved user experience.

Figure 28:
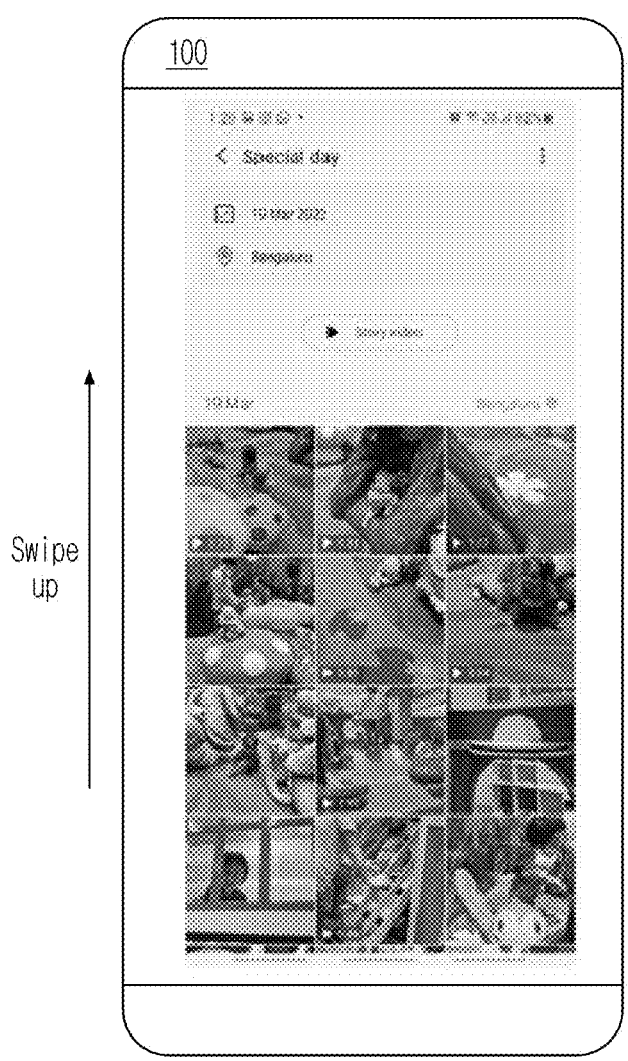
FIG. 28 is an example scenario in which the short video in the gallery is depicted, according to an embodiment of the disclosure.

FIG. 28 is an example scenario in which the short video in the gallery is depicted, according to an embodiment of the disclosure.

Referring to FIG. 28, the intelligent temporal segments may be created for all videos in the gallery and can be seen with a simple swipe up gesture.

The various actions, acts, blocks, steps, or the like in the flowcharts 200-500 and 1200-1400 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for generating at least one segment of a video, the method comprising:
    identifying, by the electronic device, at least one of a context associated with the video and an interaction of a user in connection with the video;
    analyzing, by the electronic device, at least one parameter in at least one frame of the video with reference to at least one of the context and the interaction of the user, wherein the at least one parameter comprises at least one of a subject, an environment, an action of the subject, and an object;
    determining, by the electronic device, the at least one frame in which a change in the at least one parameter occurs;
    generating, by the electronic device, at least one segment of the video comprising the at least one frame in which the at least one parameter changed as a temporal boundary of the at least one segment; and
    ranking, by the electronic device, the generated at least one segment of the video based on an affinity score and an auxiliary score,
    wherein the affinity score is computed between the video and the generated at least one segment of the video based on the generated at least one segment of the video and a computed category probability.

2. The method as claimed in claim 1, wherein the context comprises at least one of a discussion regarding the video in a social media application, capturing a screenshot of the frame of the video, sharing the video, editing the video, or generating a story based on the video.

3. The method as claimed in claim 1, wherein the segment comprises at least one of a short video story, a combination of video clips, or a video clip.

4. The method as claimed in claim 1, wherein a length of the at least one segment is less than a length of the video.

5. The method as claimed in claim 1, wherein the interaction of the user in connection with the video includes interaction of the user with at least one of the subject, the environment, an action of the subject, or the object.

6. The method as claimed in claim 1, wherein predicting the temporal boundary comprises establishing, by the electronic device, a relationship between frames of the video by utilizing a Temporal self-similarity Matrix (TSSM).

7. The method as claimed in claim 1,
    wherein the method further comprises performing at least one action, by the electronic device, using the temporal boundary of the at least one segment, and
    wherein the at least one action comprises at least one of a video screenshot, a smart share suggestion for the video, a boundary aware story in a gallery, or a tap and download video cuts in a video editor.

8. The method as claimed in claim 1, wherein the at least one segment of the video is generated with or without the context.

9. The method as claimed in claim 1, wherein the generated at least one segment of the video is appended with a predefined number of frames before a first frame to generate the at least one segment of the video.

10. The method as claimed in claim 1, wherein the at least one segment of the video is generated by:
   refining taxonomy free boundaries of the video;
   predicting a boundary category;
   generating and filtering taxonomy free proposals based on the refined taxonomy free boundaries and the boundary category; and
   generating temporal segment from at least one generated taxonomy free proposal.

11. An electronic device, comprising:
   a processor;
   a memory; and
   a video segment generator, coupled with the processor and the memory, configured to:
      identify at least one of a context associated with a video and an interaction of a user in connection with the video,
      analyze at least one parameter in at least one frame of the video with reference to at least one of the context and the interaction of the user, wherein the at least one parameter comprises at least one of a subject, an environment, an action of the subject, and an object in connection with the context or taxonomy free,
      determine the at least one frame in which a change in the at least one parameter occurs,
      generate at least one segment of the video comprising the at least one frame in which the at least one parameter changed as a temporal boundary of the at least one segment, and
      rank the generated at least one segment of the video based on an affinity score and an auxiliary score,
   wherein the affinity score is computed between the video and the generated at least one segment of the video based on the generated at least one segment of the video and a computed category probability.

12. The electronic device as claimed in claim 11, wherein the context comprises at least one of a discussion regarding the video in a social media application, capturing a screenshot of the frame of the video, sharing the video, editing the video, or generating a story based on the video.

13. The electronic device as claimed in claim 11, wherein the segment comprises at least one of a short video story, a combination of video clips, or a video clip.

14. The electronic device as claimed in claim 11, wherein a length of the at least one segment is less than a length of the video.

15. The electronic device as claimed in claim 11, wherein the interaction of the user in connection with the video includes interaction of the user with at least one of the subject, the environment, an action of the subject, or the object.

16. The electronic device as claimed in claim 11, wherein the video segment generator predicts the temporal boundary by establishing a relationship between frames of the video by utilizing a Temporal self-similarity Matrix (TSSM).

17. The electronic device as claimed in claim 11,
   wherein the video segment generator performs at least one action using the temporal boundary of the at least one segment, and
   wherein the at least one action comprises at least one of a video screenshot, a smart share suggestion for the video, a boundary aware story in a gallery, or a tap and download video cuts in a video editor.

18. The electronic device as claimed in claim 11, wherein the video segment generator is further configured to identify the context based on the interaction of the user.

19. The electronic device as claimed in claim 11, wherein the auxiliary score is calculated based on the context associated with the video and a boundary category.

* * * * *